(12) United States Patent
Rentsch et al.

(10) Patent No.: US 11,505,678 B2
(45) Date of Patent: Nov. 22, 2022

(54) USE OF MONO-SUBSTITUTED SUCCINIC ANHYDRIDE

(71) Applicant: OMYA INTERNATIONAL AG, Oftringen (CH)

(72) Inventors: Samuel Rentsch, Spiegel bei Bern (CH); Matthias Welker, Hésingue (FR); Michael Knerr, Oftringen (CH)

(73) Assignee: OMYA INTERNATIONAL AG, Oftringen (CH)

( * ) Notice: Subject to any disclaimer, the term of this patent is extended or adjusted under 35 U.S.C. 154(b) by 318 days.

(21) Appl. No.: 16/347,807

(22) PCT Filed: Nov. 6, 2017

(86) PCT No.: PCT/EP2017/078350
§ 371 (c)(1),
(2) Date: May 6, 2019

(87) PCT Pub. No.: WO2018/083304
PCT Pub. Date: May 11, 2018

(65) Prior Publication Data
US 2019/0256688 A1 Aug. 22, 2019

Related U.S. Application Data

(60) Provisional application No. 62/421,489, filed on Nov. 14, 2016.

(30) Foreign Application Priority Data

Nov. 7, 2016 (EP) ..................................... 16197583

(51) Int. Cl.
| C08K 13/02 | (2006.01) |
| C08J 3/20 | (2006.01) |
| C08K 3/26 | (2006.01) |
| C08K 5/1539 | (2006.01) |
| C09C 1/02 | (2006.01) |

(52) U.S. Cl.
CPC ............... *C08K 13/02* (2013.01); *C08J 3/201* (2013.01); *C08K 3/26* (2013.01); *C08K 5/1539* (2013.01); *C09C 1/021* (2013.01); *C08K 2003/265* (2013.01); *C08K 2003/267* (2013.01); *C08K 2201/005* (2013.01); *C08K 2201/006* (2013.01)

(58) Field of Classification Search
CPC .............. C08K 13/02; C08K 5/1539; C08K 2201/005; C08K 2201/006; C08J 3/201
USPC ...................................................... 524/425
See application file for complete search history.

(56) References Cited

U.S. PATENT DOCUMENTS

| 5,206,087 A * | 4/1993 | Tokiwa ................. C08L 101/00 428/325 |
| 8,901,224 B2 | 12/2014 | Feichtinger et al. |
| 2011/0040011 A1 | 2/2011 | Feichtinger et al. |
| 2012/0135169 A1* | 5/2012 | Tangelder ............... C08L 67/04 428/35.2 |
| 2015/0240056 A1 | 8/2015 | Rentsch et al. |
| 2017/0204536 A1 | 7/2017 | Brunner et al. |

FOREIGN PATENT DOCUMENTS

| CN | 104736646 A | 6/2015 |
| EP | 1099795 A1 | 5/2001 |
| EP | 2 371 766 | 10/2011 |
| EP | 2 447 213 | 5/2012 |
| EP | 2 524 898 | 11/2012 |
| EP | 2 722 368 | 4/2014 |
| EP | 2 952 543 * | 6/2014 |
| EP | 2 840 065 | 2/2015 |
| EP | 3028830 B1 | 11/2017 |
| EP | 2963162 B1 | 5/2018 |
| EP | 3152256 B1 | 5/2020 |
| JP | 1-254729 A | 10/1989 |
| JP | 2604197 B2 | 4/1997 |
| JP | 2016-503373 A | 2/2016 |
| JP | 2017-516904 A | 6/2017 |
| JP | 2018-500413 A | 1/2018 |
| RU | 2223355 C2 | 2/2004 |
| WO | 2010/001268 | 1/2010 |
| WO | WO 2010/118041 * | 10/2010 |
| WO | 2013/142473 | 9/2013 |
| WO | 2013/190274 | 12/2013 |
| WO | 2014/060286 | 4/2014 |
| WO | 2014/102197 | 7/2014 |
| WO | 2015/185533 | 12/2015 |
| WO | 2016/000968 A1 | 1/2016 |
| WO | 2016/071226 A1 | 5/2016 |
| WO | 2016/110459 A1 | 7/2016 |

OTHER PUBLICATIONS

International Search Report and Written Opinion dated Apr. 5, 2018 in corresponding International Patent Application No. PCT/EP2017/078350, filed Nov. 6, 2017, 10 pages.

(Continued)

*Primary Examiner* — Doris L Lee
(74) *Attorney, Agent, or Firm* — Sheppard, Mullin, Richter & Hampton LLP

(57) ABSTRACT

The use of at least one mono-substituted succinic anhydride is described before or during compounding of a polymer composition including at least one polymer as polymer component and at least one calcium carbonate-based material as filler. The use of the at least one mono-substituted succinic anhydride can reduce the polymer decomposition during processing and/or can decrease the melt flow rate of such a compounded polymer composition by at least 10%. The use can also increase the viscosity of such a compounded polymer composition by at least 10%, in comparison to the same polymer composition that has been treated the same way in the absence of any mono-substituted succinic anhydride, wherein the polymer composition does not include polylactic acid.

28 Claims, No Drawings

(56) References Cited

OTHER PUBLICATIONS

Arunee Tabtiang et al., European Polymer Journal, "The performance of selected unsaturated coatings for calcium carbonate filler in polypropylene", vol. 36, No. 1, Jan. 2000, pp. 137-148.
Office Action dated Aug. 31, 2021 in Japanese Patent Application No. 2019-522212 and English translation thereof, 7 pages.
Office Action dated Oct. 29, 2020 in Chinese Patent Application No. 201780067752.1, 19 pages.
E. Efthimiadou et al., "Stimuli-responsive biopolymer nanocarriers for drug delivery applications", Stimuli Responsive Polymeric Nanocarriers for Drug Delivery Applications. https://doi.org/10.1016/B978-0-08-101997-9.00019-9, 2018, pp. 1-28.

* cited by examiner

USE OF MONO-SUBSTITUTED SUCCINIC ANHYDRIDE

CROSS-REFERENCE TO PRIOR APPLICATIONS

This application is a National Stage of PCT/EP2017/078350, filed Nov. 6, 2017, and designating the United States (published on May 11, 2018, as WO 2018/083304 A1), which claims priority under 35 U.S.C. § 119 to European Patent Application No. 16197583.4, filed Nov. 7, 2016, and under 35 U.S.C. § 120 to Provisional Application No. 62/421,489, filed Nov. 14, 2016, each hereby expressly incorporated by reference in its entirety and each assigned to the assignee hereof.

The present invention refers to the use of mono-substituted succinic anhydride in relation to the extrusion of polymer compositions as well as to a method for reducing polymer decomposition during processing.

Nowadays many products are made from plastic since this material has a low density and, therefore, is light, has a low thermal conductivity, is strong, easily processed and unbreakable. Polymers can be produced or obtained from different sources like from fossil fuels or from biopolymers and can be divided in thermoplastic, thermosetting and elastomeric materials. Known and mostly used polymers are, for example, polyethylene (PE), polypropylene (PP), polyvinylchloride (PVC), polybutyrate adipate terephthalate (PBAT), polyhydroxybutyrate (PHB) and polycaprolactone (PCL).

Furthermore, often particulate fillers are incorporated in polymer materials in order to safe polymers and raw materials as well as in order to change the properties of polymers. By incorporating such fillers less polymer is used and, therefore, the incorporation of fillers in polymer compositions may lead to a reduction of polymer material. Thereby, the end price of the polymer product may be decreased. Furthermore, fillers are often used to change and/or improve the properties of polymer material. For example, fillers are added to change the colour of the polymer. Alternatively, fillers are added with the aim of changing the chemical and mechanical properties of the polymer, for example, to change the softening temperature, the Young's modulus, impact strength or tensile strength.

As described above, fillers are discrete particles that are added to material like plastics, to lower the consumption of more expensive binder material or to better some properties of the mixtured material. Among the most important fillers, calcium carbonate holds the largest market volume and is mainly used in the plastics sector.

Materials comprising polymers and fillers like calcium carbonate are described in a number of documents. For instance, WO 2013/190274 A2 refers to compositions comprising a polymer and a particulate mineral filler. The polymer can be polyhydroxybutyrate (PHB), and the particulate mineral filler comprises calcined clay promoting the biodegradability of such polymers.

WO 2015/185533 relates to a polymer composition comprising at least 20.0 wt.-%, based on the total weight of the polymer composition, of at least one biodegradable polymer resin, from 0.1 to 20.0 wt.-%, based on the total weight of the polymer composition, of at least one polyolefin selected from polyethylene and/or polypropylene and from 5.9 to 60.0 wt.-%, based on the total weight of the polymer composition, of an inorganic filler material dispersed in the at least one polyolefin and the at least one biodegradable polymer resin. The filler material may be an alkaline inorganic filler material.

WO 2010/001268 A2 refers to a bio-degradable packaging film, wherein the film includes a blend that comprises: at least one thermoplastic starch in an amount of from about 10 wt. % to about 60 wt. % of the blend, at least one polylactic acid in an amount of from about 1 wt. % to about 30 wt. % of the blend, at least one aliphatic-aromatic copolyester in an amount of from about 20 wt. % to about 70 wt. % of the blend, and at least one filler in an amount of from about 1 wt. % to about 25 wt. % of the blend, wherein the ratio of the total weight percentage of the aliphatic-aromatic copolyester and thermoplastic starch to the total weight percentage of the polylactic acid and filler is from about 1 to about 10.

WO 2014102197 A1 refers to a nonwoven fabric comprising at least one polymer comprising a polyester and at least one filler comprising calcium carbonate. WO 2014102197 A1 further relates to a process of producing such a nonwoven fabric as well as to the use of calcium carbonate as filler in a nonwoven fabric comprising at least one polymer comprising a polyester.

U.S. Pat. No. 8,901,224 B2 refers to a process for producing a filled polymer material as well as to the filled polymer material. More precisely, a thermoplastic polymer material that is filled with at least one filler, preferably calcium carbonate $CaCO_3$ is disclosed that is sensitive to hydrolytic degradation and optionally hygroscopic.

A general disadvantage which is observed when calcium carbonate is incorporated in polymer compositions is that the mechanical or rheological properties of these polymer compositions deteriorate. The incorporation of calcium carbonate in polymers may, for example, lead to a higher melt flow rate. This means that the polymer becomes more fluid upon heating which is an indication for a lowering of the molecular weight of the polymers or the hydrolysis of the polymers. If the polymer gets too liquid/fluid this represents a problem or disadvantage for the processing of the polymer, not only in regular processing but also during recycling processes.

Thus, there is still a need in the art for technical solutions which address the foregoing technical problems and which especially allow for improving the thermal stability and processability of a polymer composition comprising at least one polymer as polymer component and calcium carbonate-comprising material as filler at high temperatures. Furthermore, there is still the need for polymer compositions comprising at least one polymer as polymer component and calcium carbonate-comprising material as filler with improved mechanical properties and especially with a decreased melt flow rate. Furthermore, there is still the need for polymer compositions comprising at least one polymer as polymer component and calcium carbonate-comprising material as filler with improved mechanical properties and especially with an increased viscosity.

Accordingly, it is an objective of the present invention to provide a technical solution which addresses the above-mentioned problems and which especially improves the stability of a polymer composition comprising at least one polymer as polymer component and calcium carbonate-comprising material as filler during processing especially the thermal stability. A further objective is to facilitate the processability of a polymer composition comprising at least one polymer as polymer component and calcium carbonate-comprising material as filler during processing especially at high temperatures. Another object of the present invention is to improve the mechanical properties, especially the melt flow rate of a polymer composition comprising at least one polymer as polymer component and calcium carbonate-comprising material as filler. An alternative object of the present invention is to improve the mechanical properties, especially increase the viscosity of a polymer composition comprising at least one polymer as polymer component and calcium carbonate-comprising material as filler. Furthermore, it is an object of the present invention to provide polymer compositions that do not comprise polylactic acid.

The foregoing and other objectives are solved by the subject-matter as defined herein in claim 1.

Advantageous embodiments of the invention are defined in the corresponding sub-claims.

According to one aspect of the present invention at least one mono-substituted succinic anhydride is used before or during compounding of a polymer composition comprising at least one polymer as polymer component and at least one calcium carbonate-comprising material as filler, to reduce the polymer decomposition during processing and/or to decrease the melt flow rate of such a compounded polymer composition by at least 10% and/or to increase the viscosity of such a compounded polymer composition by at least 10%, in comparison to the same polymer composition that has been treated the same way in the absence of any mono-substituted succinic anhydride, wherein the polymer composition does not comprise polylactic acid.

The inventors surprisingly found out that according to the present invention, the stability especially the thermal stability of a polymer composition comprising at least one polymer as polymer component and calcium carbonate-comprising material as filler can be significantly improved when using at least one mono-substituted succinic anhydride before or during compounding of the polymer composition. Furthermore, the inventors surprisingly found that the processability of a polymer composition can be facilitated when using at least one mono-substituted succinic anhydride before or during compounding of the polymer composition. Furthermore, according to the present invention, the mechanical properties and especially the melt flow rate of a polymer composition comprising at least one polymer as polymer component and calcium carbonate-comprising material as filler can be improved. Alternatively, the viscosity of a polymer composition comprising at least one polymer as polymer component and calcium carbonate-comprising material as filler can be increase. In particular, this is achieved by using at least one mono-substituted succinic anhydride before or during compounding of the polymer composition.

According to another aspect of the present invention a method for reducing the polymer decomposition during processing and/or decreasing the melt flow rate of a polymer composition comprising at least one polymer as polymer component and at least one calcium carbonate-comprising material as filler by at least 10% and/or increasing the viscosity of a polymer composition comprising at least one polymer as polymer component and at least one calcium carbonate-comprising material as filler by at least 10%, in comparison to the same polymer composition that has been treated the same way in the absence of any mono-substituted succinic anhydride the method comprising
  a) providing at least one polymer as polymer component and
  b) providing at least one calcium carbonate-comprising material as filler and
  c) providing at least one mono-substituted succinic anhydride
  d) contacting the components of a), b) and c) in any order and
  e) compounding the contacted components of step d) wherein the polymer composition does not comprise polylactic acid is provided.

According to another aspect of the present invention the use of a polymer composition obtainable by a process comprising the steps of
  a) providing at least one polymer as polymer component and
  b) providing at least one calcium carbonate-comprising material as filler and
  c) providing at least one mono-substituted succinic anhydride
  d) contacting the components of a), b) and c) in any order and
  e) compounding the contacted components of step d),
  in hygiene products, medical and healthcare products, filter products, geotextile products, agriculture and horticulture products, clothing, footwear and baggage products, household and industrial products, packaging products, construction products and the like, wherein the polymer composition does not comprise polylactic acid is provided.

According to another aspect of the present invention an article comprising a polymer composition obtainable by a process comprising the steps of
  a) providing at least one polymer as polymer component and
  b) providing at least one calcium carbonate-comprising material as filler and
  c) providing at least one mono-substituted succinic anhydride
  d) contacting the components of a), b) and c) in any order and
  e) compounding the contacted components of step d),
  wherein the article is selected from the group comprising hygiene products, medical and healthcare products, filter products, geotextile products, agriculture and horticulture products, clothing, footwear and baggage products, household and industrial products, packaging products, construction products and the like, wherein the polymer composition does not comprise polylactic acid is provided.

Advantageous embodiments of the present invention are defined in the corresponding sub-claims.

According to one embodiment of the present invention the at least one mono-substituted succinic anhydride consists of succinic anhydride mono-substituted with a group selected from a linear, branched, aliphatic and cyclic group having a total amount of carbon atoms from C2 to C30, preferably from C3 to C25, and most preferably from C4 to C20 in the substituent, in case of branched groups having a total amount of carbon atoms from C3 to C30, preferably from C3 to C25, and most preferably from C4 to C20 in the substituent and in case of cyclic groups having a total amount of carbon atoms from C5 to C30, preferably from C5 to C25, and most preferably from C5 to C20 in the substituent.

According to one embodiment of the present invention the at least one mono-substituted succinic anhydride is at least one alkyl mono-substituted succinic anhydride, preferably at least one alkyl mono-substituted succinic anhydride selected from the group consisting of ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof and/or at least one alkenyl mono-substituted succinic anhydride, preferably at least one alkenyl mono-substituted succinic anhydride selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

According to one embodiment of the present invention the at least one mono-substituted succinic anhydride is used before compounding of the polymer composition in that the at least one mono-substituted succinic anhydride and/or salty reaction products thereof are present on the surface of the at least one calcium carbonate-comprising material.

According to one embodiment of the present invention the at least one mono-substituted succinic anhydride is used during compounding of the polymer composition in that the at least one mono-substituted succinic anhydride is contacted under mixing with the polymer composition comprising at least one polymer as polymer component and at least one calcium carbonate-comprising material as filler.

According to one embodiment of the present invention the at least one mono-substituted succinic anhydride and/or salty reaction products thereof are present in the polymer composition in an amount of at least 0.1 wt.-%, based on the total dry weight of the at least one calcium carbonate-comprising filler material, preferably in an amount from 0.1 to 4.0 wt.-%, more preferably in an amount from 0.1 to 3.0 wt.-%, even more preferably in an amount from 0.2 to 2.0 wt.-%, even more preferably in an amount from 0.3 to 1.5 wt.-% and most preferably in an amount from 0.4 to 1.2 wt.-%.

According to one embodiment of the present invention the polymer component comprises polymers obtained from fossil fuels, preferably the polymers are selected from polyolefins, and most preferably the are selected from polyethylene (PE), polypropylene (PP), polymethylpentene (PMP), polybutene-1 (PB-1), polyketone (PK), polystyrene (PS), polyvinylchloride (PVC) and mixtures thereof.

According to one embodiment of the present invention the polymer component comprises polymers obtained from biopolymers and preferably the polymers are selected from polybutyrate adipate terephthalate (PBAT), polyhydroxyalkanolates (PHA) like polyhydroxybutyrate (PHB), polyhydroxyvalerate (PHV), polyhydroxyhexonate (PHH), polyhydroxyoctanoate (PHO) and copolymers of polyhydroxyalkanoates, polycaprolactone (PCL), polyglycolacids (PGA), polybutylene succinate (PBS), polybutylene succinate adipate (PBSA), polytrimethylene terephthalate (PTT), polybutylene terephthalate (PBT), polybutylene succinate terephthalate (PBST), cellophane (CH), celluloseethers, celluloseesters, starch acetate and/or starch blends even more preferably are selected from polybutyrate adipate terephthalate (PBAT), polyhydroxyalkanolates (PHA), polycaprolactone (PCL) and/or starch acetate and/or starch blends and most preferably are selected from the group consisting of polybutyrate adipate terephthalate (PBAT), polyhydroxybutyrate (PHB) and polycaprolactone (PCL).

According to one embodiment of the present invention the at least one mono-substituted succinic anhydride and/or salty reaction products thereof are present in the polymer composition in an amount of at least 0.005 wt.-%, based on the total weight of the polymer component, preferably in an amount from 0.01 to 5.0 wt.-%, more preferably in an amount from 0.02 to 1.0 wt.-%, even more preferably in an amount from 0.03 to 0.8 wt.-%, even more preferably in an amount from 0.05 to 0.5 wt.-% and most preferably in an amount from 0.07 to 0.3 wt.-%.

According to one embodiment of the present invention the calcium carbonate-comprising material is selected from the group consisting of ground calcium carbonate, preferably marble, limestone, dolomite and/or chalk, precipitated calcium carbonate, preferably vaterite, calcite and/or aragonite, and mixtures thereof, more preferably the calcium carbonate-comprising material is ground calcium carbonate.

According to one embodiment of the present invention the calcium carbonate-comprising material has i) a weight median particle size $d_{50}$ value in the range from 0.1 µm to 20 µm, preferably in the range from 0.25 µm to 15 µm, more preferably in the range from 0.5 µm to 10 µm and most preferably in the range from 0.7 µm to 7 µm and/or ii) a top cut ($d_{98}$) of ≤50 µm, preferably of ≤30 µm, more preferably of ≤20 µm and most preferably of ≤15 µm and/or iii) a specific surface area (BET) of from 0.5 to 150 $m^2/g$ as measured using nitrogen and the BET method according to ISO 9277:2010, preferably from 1 to 60 $m^2/g$, and more preferably from 1.5 to 15 $m^2/g$ and/or iv) a residual total moisture content of from 0.01 wt.-% to 1 wt.-%, based on the total dry weight of the at least one calcium carbonate-comprising material, preferably from 0.02 wt.-% to 0.5 wt.-%, more preferably from 0.03 wt.-% to 0.3 wt.-%, and most preferably from 0.04 wt.-% to 0.15 wt.-%.

According to one embodiment of the present invention the calcium carbonate-comprising material is present in the polymer composition in an amount from 0.1 to 85 wt.-%, based on the total weight of the polymer component, preferably in an amount from 3 to 50 wt.-%, more preferably in an amount from 5 to 40 wt.-%, and most preferably in an amount from 10 to 30 wt.-%.

According to one embodiment of the present invention the polymer composition comprises further additives such as colouring pigments, dyes, waxes, lubricants, oxidative- and/or UV-stabilizers, antioxidants and other fillers, such as talc.

According to another embodiment of the present invention in contacting step d) firstly the at least one calcium carbonate-comprising material of step b) is contacted under mixing, in one or more steps, with the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the at least one polymer.

It should be understood that for the purposes of the present invention, the following terms have the following meanings:

The term "succinic anhydride", also called dihydro-2,5-furandione, succinic acid anhydride or succinyl oxide, has the molecular formula $C_4H_4O_3$ and is the acid anhydride of succinic acid and is known under the CAS number 108-30-5.

The term "mono-substituted succinic anhydride" in the meaning of the present invention refers to a succinic anhydride wherein a hydrogen atom is substituted by another substituent.

The term "salty reaction products of at least one mono-substituted succinic anhydride" in the meaning of the present invention refers to products obtained by contacting a calcium carbonate-comprising filler material with one or more mono-substituted succinic anhydride(s). Said salty reaction products are formed between the mono-substituted succinic acid which is formed from the applied mono-substituted succinic anhydride and reactive molecules located at the surface of the calcium carbonate-comprising filler material.

The term "compounding" according to the present invention refers to the preparation of a polymer or plastic formulation by mixing and/or blending at least one polymer component with at least one additive, for example the calcium carbonate-comprising filler material in a molten or softened state in order to achieve a homogenous blend of the different raw materials. The dispersive and distributive mixing is performed at temperatures at which the polymer components are in a molten or softened state but below decomposition temperature. Compounding methods are known to the skilled person, for example, the compounding may be done by extrusion, for example with a twin screw extruder or a co-kneader.

As used herein the term "polymer" generally includes homopolymers and copolymer such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

The term "glass transition temperature" in the meaning of the present invention refers to the temperature at which the glass transition occurs, which is a reversible transition in amorphous materials (or in amorphous regions within semi-crystalline materials) from a hard and relatively brittle state into a molten or rubber-like state. The glass-transition temperature is always lower than the melting point of the crystalline state of the material, if one exists. The term "melting point" in the meaning of the present invention refers to the temperature at which a solid changes state from solid to liquid at atmospheric pressure. At the melting point the solid and liquid phase exist in equilibrium. Glass-transition temperature and melting point are determined by ISO 11357 with a heating rate of 10° C./min.

The term "polymer composition" according to the present invention refers to a composition comprising at least one polymer as polymer component and at least one calcium carbonate-comprising material as filler.

The term "polylactic acid" according to the present invention refers to polymers that comprise Formula I as repeating unit

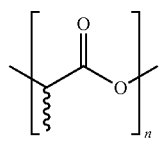

Formula (I)

Lactic acid is chiral and, therefore, refers to two optical isomers. One is known as L-(+)-lactic acid or (S)-lactic acid and the other, its mirror image, is D-(−)-lactic acid or (R)-lactic acid. A mixture of the two in equal amounts is called DL-lactic acid, or racemic lactic acid. Due to this chirality different types of polylactic acid are known, for example, PLLA (Poly-L-lactic acid), PDLA (Poly-D-lactic acid), and PDLLA (Poly-DL-lactic acid).

For the purpose of the present invention, the term "calcium carbonate-comprising filler material" or "calcium carbonate-comprising material" refers to a material that comprises at least 60 wt.-% and preferably at least 80 wt.-% calcium carbonate, based on the total dry weight of the calcium carbonate-comprising filler material.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example, by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation from a calcium and a carbonate source in water. Additionally, precipitated calcium carbonate can also be the product of introducing calcium and carbonate salts, calcium chloride and sodium carbonate for example, in an aqueous environment. PCC may have a vateritic, calcitic or aragonitic crystalline form. PCCs are described, for example, in EP 2 447 213 A1, EP 2 524 898 A1, EP 2 371 766 A1, EP 2 840 065 A1, or WO 2013/142473 A1.

The term "dry" or "dried" material is understood to be a material having between 0.001 to 0.5 wt.-% of water, based on the total weight of the calcium carbonate-comprising material weight. The % water (equal to "moisture content") is determined gravimetrically. "Drying" in the sense of the present invention means that heating is carried out until the moisture content of the calcium carbonate-comprising material is in the range from 0.001 to 0.5% by weight, based on the total weight of the calcium carbonate-comprising material weight.

The "particle size" of particulate materials, for example the calcium carbonate-comprising material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. The $d_{98}$ value is also designated as "top cut". Particle sizes were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_2P_2O_7$. The samples were dispersed using a high speed stirrer and sonicated.

A "specific surface area (SSA)" of a calcium carbonate-comprising material in the meaning of the present invention is defined as the surface area of the calcium carbonate-comprising material divided by its mass. As used herein, the specific surface area is measured by nitrogen gas adsorption using the BET isotherm (ISO 9277:2010) and is specified in $m^2/g$.

For the purpose of the present application, "water-insoluble" materials are defined as materials which, when 100 g of said material is mixed with 100 g deionised water and filtered on a filter having a 0.2 µm pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 µm pore size at 20° C. to recover the liquid filtrate, provide more than 0.1 g of recovered solid material following evaporation at 95 to 100° C. of 100 g of said liquid filtrate at ambient pressure.

A "suspension" or "slurry" in the meaning of the present invention comprises insoluble solids and a solvent or liquid, preferably water, and optionally further additives, and usually contains large amounts of solids and, thus, is more viscous and can be of higher density than the liquid from which it is formed.

For the purpose of the present invention, the "solids content" of a liquid composition is a measure of the amount of material remaining after all the solvent or water has been evaporated.

The term "standard conditions" according to the present invention refers to standard ambient temperature and pressure (SATP) which refers to a temperature of 298.15 K (25° C.) and an absolute pressure of exactly 100000 Pa (1 bar, 14.5 psi, 0.98692 atm).

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention it has been found that mono-substituted succinic anhydride may be used before or during compounding of a polymer composition to improve the stability especially the thermal stability of a polymer composition comprising at least one polymer as polymer component and calcium carbonate-comprising material as filler and/or to facilitate the processability of such a polymer composition and/or to improve the mechanical properties, especially the melt flow rate or the viscosity of such polymer composition. Thus, according to the present invention the use of at least one mono-substituted succinic anhydride before or during compounding of a polymer composition comprising at least one polymer as polymer component and at least one calcium carbonate-comprising material as filler, to reduce the polymer decomposition during processing and/or to decrease the melt flow rate of such a compounded polymer composition by at least 10% and/or to increase the viscosity of such a compounded polymer composition by at least 10%, in comparison to the same polymer composition that has been treated the same way in the absence of any mono-substituted succinic anhydride, wherein the polymer composition does not comprise polylactic acid is provided.

In the following the details and preferred embodiments of the inventive use of the mono-substituted succinic anhydride before or during compounding of a polymer composition as claimed in claim 1 will be set out in more detail.

The polymer composition according to the present invention comprises at least one polymer as polymer component and at least one calcium carbonate-comprising material as filler.

The at Least One Calcium Carbonate-Comprising Material

The polymer composition of the present invention comprises at least one calcium carbonate-comprising material as filler.

The expression "at least one" calcium carbonate-comprising material means that one or more, for example, two or three calcium carbonate-comprising materials may be present in the polymer composition. According to a preferred embodiment only one calcium carbonate-comprising material is present in the polymer composition.

According to a preferred embodiment of the present invention the calcium carbonate-comprising material is selected from the group consisting of ground calcium carbonate (GCC), preferably marble, limestone, dolomite and/or chalk, precipitated calcium carbonate, preferably vaterite, calcite and/or aragonite, and mixtures thereof, more preferably the at least one calcium carbonate-comprising material is ground calcium carbonate.

Natural or ground calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising mineral material comprises a wet ground calcium carbonate-comprising mineral material, the grinding step may be performed under conditions such that autogenous grinding takes place and/or by horizontal ball milling, and/or other such processes known to the skilled man. The wet processed ground calcium carbonate-comprising mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural or ground calcium carbonate (GCC) is selected from marble, chalk, limestone, dolomite or mixtures thereof. Preferably, the source of ground calcium carbonate is marble, and more preferably dolomitic marble and/or magnesitic marble. According to one embodiment of the present invention the GCC is obtained by dry grinding. According to another embodiment of the present invention the GCC is obtained by wet grinding and subsequent drying.

"Dolomite" in the meaning of the present invention is a calcium carbonate-comprising mineral, namely a carbonic calcium-magnesium-mineral, having the chemical composition of $CaMg(CO_3)_2$ ("$CaCO_3 \cdot MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate comprises one type of ground calcium carbonate. According to another embodiment of the present invention, the calcium carbonate comprises a mixture of two or more types of ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation by combining calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

According to one embodiment of the present invention, the calcium carbonate comprises one type of precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to a preferred embodiment of the present invention the at least one calcium carbonate-comprising material is ground calcium carbonate, preferably dry ground calcium carbonate. According to another preferred embodiment, the at least one calcium carbonate-comprising material is marble.

It is appreciated that the amount of calcium carbonate in the at least one calcium carbonate-comprising filler material is at least 60 wt.-%, preferably at least 80 wt.-%, e.g. at least 95 wt.-%, more preferably between 97 and 100 wt.-%, and even more preferably between 98.5 and 99.95 wt.-%, based on the total dry weight of the at least one calcium carbonate-comprising filler material.

The at least one calcium carbonate-comprising filler material is preferably in the form of a particulate material, and may have a particle size distribution as conventionally employed for the material(s) involved in the type of product to be produced. According to one embodiment of the present invention the at least one calcium carbonate-comprising filler material has a weight median particle size $d_{50}$ value in the range from 0.1 to 20 μm. For example, the at least one calcium carbonate-comprising filler material has a weight median particle size $d_{50}$ from 0.25 μm to 15 μm, preferably from 0.5 μm to 10 μm and most preferably from 0.7 μm to 7 μm.

According to one embodiment of the present invention the at least one calcium carbonate-comprising material, preferably the ground calcium carbonate, may have a top cut ($d_{98}$) of ≤50 μm. For example, the at least one calcium carbonate-comprising material may have a top cut ($d_{98}$) of ≤30 μm, preferably of ≤20 μm and most preferably of ≤15 μm.

According to another embodiment of the present invention the specific surface area of the ground calcium carbonate and/or the precipitated calcium carbonate is from 0.5 and 150 $m^2/g$, preferably from 1 to 60 $m^2/g$ and most preferably from 1.5 to 15 $m^2/g$ as measured using nitrogen and the BET method according to ISO 9277:2010.

Depending on the at least one calcium carbonate-comprising filler material, the at least one calcium carbonate-comprising filler material according to one embodiment may have a residual total moisture content of from 0.01 to 1 wt.-%, preferably from 0.02 to 0.5 wt.-%, more preferably from 0.03 to 0.3 wt.-% and most preferably from 0.04 to 0.15 wt.-%, based on the total dry weight of the at least one calcium carbonate-comprising filler material.

For example, in case a wet ground and dried calcium carbonate is used as the at least one calcium carbonate-comprising filler material, the residual total moisture content of the at least one calcium carbonate-comprising filler material is preferably of from 0.01 to 1 wt.-%, more preferably from 0.02 to 0.1 wt.-% and most preferably from 0.04 to 0.08 wt.-% based on the total dry weight of the at least one calcium carbonate-comprising filler material. If a PCC is used as the at least one calcium carbonate-comprising filler material, the residual total moisture content of the at least one calcium carbonate-comprising filler material is preferably of from 0.01 to 1 wt.-%, more preferably from 0.05 to 0.2 wt.-% and most preferably from 0.05 to 0.15 wt.-%, based on the total dry weight of the at least one calcium carbonate-comprising filler material.

According to one embodiment of the present invention the calcium carbonate-comprising material has a weight median particle size $d_{50}$ value in the range from 0.1 µm to 20 µm, preferably in the range from 0.25 µm to 15 µm, more preferably in the range from 0.5 µm to 10 µm and most preferably in the range from 0.7 µm to 7 µm and a top cut ($d_{98}$) of ≤50 µm, preferably of ≤30 µm, more preferably of ≤20 µm and most preferably of ≤15 µm and a specific surface area (BET) of from 0.5 to 150 m²/g as measured using nitrogen and the BET method according to ISO 9277:2010, preferably from 1 to 60 m²/g, and more preferably from 1.5 to 15 m²/g and a residual total moisture content of from 0.01 wt.-% to 1 wt.-%, based on the total dry weight of the at least one calcium carbonate-comprising material, preferably from 0.02 wt.-% to 0.5 wt.-%, more preferably from 0.03 wt.-% to 0.3 wt.-%, and most preferably from 0.04 wt.-% to 0.15 wt.-%.

According to embodiment of the present invention, the at least one calcium carbonate-comprising filler material is a dry ground calcium carbonate, preferably a marble, having a median particle size diameter $d_{50}$ value from 0.1 µm to 20 µm, preferably from 0.25 µm to 15 µm, more preferably from 0.5 µm to 10 µm and most preferably from 0.7 µm to 7 µm and a BET specific surface area of from 0.5 to 150 m²/g, preferably of from 1 to 60 m²/g, more preferably of from 1.5 to 15 m²/g, measured using nitrogen and the BET method according to ISO 9277.

According to a preferred embodiment of the present invention, the at least one calcium carbonate-comprising filler material is a dry ground calcium carbonate, preferably a marble, having a median particle size diameter $d_{50}$ value from 0.7 µm to 7 µm, for example 2.6 µm and a BET specific surface area of from 1.5 to 15 m²/g, for example 2.6 m²/g, measured using nitrogen and the BET method according to ISO 9277.

According to one embodiment of the present invention a further surface coating is present on the surface of the calcium carbonate-comprising material.

The Polymer Component

The polymer composition of the present invention comprises at least one polymer as polymer component.

The expression "at least one" polymer means that one or more, for example, two or three polymers may be present in the polymer composition. According to a preferred embodiment only one polymer is present in the polymer composition. According to another preferred embodiment two polymers are present in the polymer composition.

The term "polymer" according to the present invention includes homopolymers and co-polymers such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

According to one embodiment of the present invention the polymer component comprises polymers obtained from fossil fuels. These polymers are also known as petrobased polymers. Fossil fuels are fuels formed by natural processes such as, for example, anaerobic decomposition of buried dead organisms, containing energy originating in ancient photosynthesis. The age of the organisms and their resulting fossil fuels is typically millions of years. Fossil fuels contain high percentages of carbon and include, for example, petroleum, coal, gas, kerosene or propane. Fossil fuels range from volatile materials with low carbon:hydrogen ratios like methane, to liquids like petroleum, to nonvolatile materials composed of almost pure carbon, like anthracite coal. Fossil fuels are industrially available and the skilled person knows them.

According to another embodiment of the present invention the polymer component comprises polymers obtained from biopolymers. Biopolymers according to the present invention are polymers that are biodegradable and/or based on or composed of biomass and/or renewable feedstock/biofeedstock. Biopolymers that are based on or composed of biomass and/or renewable feedstock/biofeedstock are also called "biosourced" polymers.

The term "biodegradable" polymer refers to a polymer that is capable of being broken down and disposed of with the help of bacteria or other living organisms, e.g. fungi. The term "biomass" according to the present invention is organic matter derived from living, or recently living organisms, for example from vegetable fats and oils, corn starch, or microbiota. The term "renewable feedstock" or "biofeedstock" according to the present invention refers to materials that can be used as or converted into biofuels, for example, corn, sugarcane (ethanol), soybeans or palm (biodiesel). The terms "biomass" and "renewable feedstock"/"biofeedstock" partly overlap and may not be separated clearly.

Polymers obtained from fossil fuels and biopolymers are well known to the skilled person and industrially available. Furthermore, the skilled person knows how to prepare polymers from fossil fuels or from biomass or biodegradable polymers. Various polymer mechanism are known, for example, addition or chain growth polymerizations like free radical polymerisation, ionic polymerisation or ring opening polymerisation, coordination polymerisation, condensation or step growth polymerisation, copolymerisation or biosynthesis, for example bacterial biosynthesis like bacterial fermentation processes. The polymerizations may be prepared in bulk, in solution/suspension/emulsion (also known as slurry process) or in the gas phase.

Polymers obtained from fossil fuels and biopolymers are mainly obtained from fossil fuels or from biomass or renewable feedstock/biofeedstock. However, for the production of these polymers also other components like salts, for example, sodium chloride or copper chloride, or solvents, for example, acetonitrile, tetrahydrofuran or benzene, initiators, for example, dicumyl peroxide or azoisobutylnitrile or further organic or inorganic components, for example, N,N,N',N'',N''-pentamethyl diethylene triamine (PMDETA) may be used.

According to one embodiment of the present invention the polymer component comprises polymers obtained from fossil fuels, preferably the polymers are selected from polyolefins, and most preferably the are selected from polyethylene (PE), polypropylene (PP), polymethylpentene (PMP), polybutene-1 (PB-1), polyketone (PK), polystyrene (PS), polyvinylchloride (PVC) and mixtures thereof.

According to one embodiment, the at least one polymer is a polyolefin. Polyolefin polymers that may be used are preferably selected from the group consisting of polypropylene, polyethylene, polybutylene, and mixtures thereof.

According to one embodiment, the at least one polymer is a polyethylene, preferably selected from the group consisting of high density polyethylene (HDPE), linear low density polyethylene (LLDPE), low density polyethylene (LDPE), ultra-low density polyethylene (ULDPE), very low density polyethylene (VLDPE), and mixtures thereof.

A polyethylene having a density ranging from 0.936 g/cm$^3$ to about 0.965 g/cm$^3$ is typically called "high density polyethylenes (HDPE)". A polyethylene having a density ranging from 0.910 g/cm$^3$ to about 0.940 g/cm$^3$ is typically called "low density polyethylenes (LDPE)".

The term "linear low density polyethylene (LLDPE)" refers to a substantially linear polymer (polyethylene), with significant numbers of short branches, commonly made by copolymerization of ethylene with longer-chain olefins. Linear low-density polyethylene differs structurally from low-density polyethylene (LDPE) in the absence of long chain branching. The linearity of LLDPE results from the different manufacturing processes of LLDPE. In general, LLDPE is produced at lower temperatures and pressures by copolymerization of ethylene and higher alpha-olefins such as 1-butene, 1-hexene, or 1-octene. LLDPE has typically a density in the range from 0.911 g/cm$^3$ to 0.940 g/cm$^3$, and preferably in the range from 0.912 g/cm$^3$ to 0.928 g/cm$^3$ for breathable film applications.

"Very low density linear low density polyethylenes (VLDPE) is a substantially linear polymer with high levels of short-chain branches, commonly made by copolymerization of ethylene with short-chain alpha-olefins such as 1-butene, 1-hexene or 1-octene. VLDPE has typically a density in the range from 0.900 to 0.914 g/cm$^3$.

"Ultra-low density linear low density polyethylenes (ULDPE) is a substantially linear polymer with high levels of short-chain branches, commonly made by copolymerization of ethylene with short-chain alpha-olefins such as 1-butene, 1-hexene or 1-octene. ULDPE has typically a density in the range from 0.860 to 0.899 g/cm$^3$.

According to one embodiment, the polymer comprises a linear low density polyethylene (LLDPE). According to another embodiment, the at least one polymer comprises 2 to 20 wt.-% LDPE, based on the total amount of polymer. For example, the at least one polymer comprises, preferably consists of, 80 to 98 wt.-% LLDPE, based on the total amount of polymer and 2 to 20 wt.-% LDPE, based on the total amount of polymer. It is appreciated that the sum of the amounts of the LLDPE and of the LDPE is preferably 100 wt.-%, based on the total amount of polymer.

According to another embodiment, the polymer comprises a polypropylene (PP), for example a PP having a density in the range from 0.890 g/cm$^3$ to 0.910 g/cm$^3$.

According to another embodiment the polymer comprises polymethylpentene (PMP), also known as poly(4-methyl-1-pentene), which is a thermoplastic polymer of 4-methyl-1-pentene. Polymethylpentene is also known under the brand name TPX from Mitsui Chemicals. Polymethylpentene is a 4-methyl-1-pentene based linear isotactic polyolefin and is often made by Ziegler-Natta type catalysis from fossil fuels.

According to another embodiment the polymer comprises polybutylene also known as polybutene-1, poly(1-butene), or PB-1. Polybutylene is a polyolefin or saturated polymer with the chemical formula (C$_4$H$_8$)$_n$ and is often produced by polymerisation of 1-butene, a fossil fuel, using supported Ziegler-Natta catalysts. PB-1 is a high molecular weight, linear, isotactic, and semi-crystalline polymer.

According to another embodiment the polymer comprises at least one polyketone (PK). Polyketones are a family of high-performance thermoplastic polymers that comprise polar ketone groups in the polymer backbone which gives this material rise to a strong attraction between the polymer chains. A ketone group is an organic compound with the structure RC(=O)R', where R and R' can be a variety of carbon-containing substituents. Polyketones are known to the skilled person and are industrially available, for example, under the trade names Carilon, Karilon, Akrotek, and Schulaketon.

According to another embodiment the polymer comprises polystyrene (PS). Polystyrene (PS) is a synthetic aromatic polymer made from the monomer styrene and can be solid or foamed. Polystyrene is a long chain hydrocarbon wherein alternating carbon centers are attached to phenyl groups. The chemical formula of polystyrene is (C$_8$H$_8$)$_n$ and contains the chemical elements carbon and hydrogen. The polystyrene can by atactic or syndiotactic. Atactic means that the phenyl groups are randomly distributed on both sides of the polymer chain. Syndiotactic means that the phenyl groups are positioned on alternating sites of the hydrocarbon backbone.

According to one embodiment the polystyrene is only atactic. According to a preferred embodiment the polystyrene is only syndiotactic. Alternatively, the polymer may be a mixture of atactic and syndiotactic polystyrene.

According to another embodiment the polymer comprises polyvinylchloride (PVC). Polyvinyl chloride, or poly(vinyl chloride), commonly abbreviated PVC, is produced by polymerization of the vinyl chloride monomer and has the chemical formula (C$_2$H$_3$Cl)$_n$. PVC comes in two basic forms, namely rigid (sometimes abbreviated as RPVC) and flexible.

Polyvinyl chloride is known to the skilled person and industrially available, for example from INEOS Chlor Americas Inc., Wilmington, USA as Evipol SH6030 PVC.

According to one embodiment, the polyvinyl chloride comprises a polyvinyl chloride homopolymer or a copolymer of vinyl chloride with a copolymerizable ethylenically unsaturated monomer. In case a homopolymer of polyvinyl chloride is provided, the polyvinyl chloride contains monomers consisting of vinyl chloride alone. If a polyvinyl chloride copolymer is provided, the polyvinyl chloride contains a mixture of monomers comprising a predominant amount of monomers consisting of vinyl chloride. In one preferred embodiment, the polyvinyl chloride resin contains a mixture of monomers comprising an amount of monomers consisting of vinyl chloride of at least 60 wt.-%, based on the total weight of the monomer mixture. Vinyl chloride copolymers are preferably composed of vinyl chloride and from 1 to 40 wt.-% of a copolymerizable ethylenically unsaturated monomer, based on the total weight of the monomer mixture. Preferably, the copolymerizable ethylenically unsaturated monomer is selected from the group consisting of vinylidene chloride, vinyl acetate, vinyl butyrate, vinyl benzoate, vinylidene chloride, diethyl fumarate, diethyl maleate, vinyl propionate, methyl acrylate, butyl acrylate, methyl methacrylate, ethyl methacrylate, butyl methacrylate, styrene, vinyl ethers such as vinyl ethyl ether, vinyl chloroethyl ether and vinyl phenyl ether, vinyl ketones such as vinyl methyl ketone and vinyl phenyl ketone, acrylonitrile, chloroacrylonitrile and mixtures thereof. It is further preferred that the polyvinyl chloride copolymers of the present invention comprise monomers of vinyl chloride and vinyl acetate, vinyl chloride and vinyl acetate and maleic anhydride or vinyl chloride and vinylidene chloride.

In one preferred embodiment, the polyvinyl chloride resin comprises a homopolymer of polyvinyl chloride.

According to another embodiment of the present invention the polymer comprises polycarbonate (PC). Polycarbonate is a polymer that contains carbonate groups (—O—(C=O)—O—) and is also known under the trade names Lexan, Makrolon, Hammerglass and others. Polycarbonate can be obtained by the reaction of bisphenol A (BPA) with NaOH and afterwards with phosgene COCl$_2$. An alternative route to polycarbonates entails the transesterification from BPA and diphenyl carbonate, wherein the diphenyl carbonate can be derived in part from carbon monoxide.

According to another embodiment of the present invention the polymer comprises a polyester. Polyesters are a class of polymers which contain the ester functional group in their main chain and are generally obtained by a polycondensation reaction. Polyesters may include naturally occurring polymers such as cutin as well as synthetic polymers such as polycarbonate or poly butyrate. Depending on their structure polyesters may be biodegradable. The term "biodegradable" within the meaning of the present invention relates to a substance or object capable of being broken down or decomposed with the help of bacteria or other living organisms and thereby avoiding environmental pollution.

According to one embodiment, the polyester is selected form the group consisting of a polyglycolic acid, a polycaprolactone, a polyethylene adipate, a polybutylene adipate, a polyhydroxyalkanoate (PHA), a polyhydroxybutyrate, a polyalkylene terephthalate, a polyethylene terephthalate (PET), a polytrimethylene terephthalate, a polybutylene terephthalate, a polyethylene naphthalate, or a mixture thereof, or copolymers thereof. Copolymers thereof may be, for example, poly(butylene adipate-co-terephthalate) (PBAT). Any of these polymers may be in pure form, i.e. in form of a homopolymer, or may be modified by copolymerization and/or by adding one or more substituents to the main chain or side chains of the main chain.

According to another embodiment of the present invention the polymer component comprises polymers obtained from biopolymers and preferably the polymers are selected from polybutyrate adipate terephthalate (PBAT), polyhydroxyalkanolates (PHA) like polyhydroxybutyrate (PHB), polyhydroxyvalerate (PHV), polyhydroxyhexonate (PHH), polyhydroxyoctanoate (PHO) and copolymers of polyhydroxyalkanoates, polycaprolactone (PCL), polyglycolacids (PGA), polybutylene succinate (PBS), polybutylene succinate adipate (PBSA), polytrimethylene terephthalate (PTT), polybutylene terephthalate (PBT), polybutylene succinate terephthalate (PBST), cellophane (CH), celluloseethers, celluloseesters, starch acetate and/or starch blends even more preferably are selected from polybutyrate adipate terephthalate (PBAT), polyhydroxyalkanolates (PHA), polycaprolactone (PCL) and/or starch acetate and/or starch blends and most preferably are selected from the group consisting of polybutyrate adipate terephthalate (PBAT), polyhydroxybutyrate (PHB) and polycaprolactone (PCL).

According to one embodiment the polymer component comprises only one sort of polymer. Preferably the polymer is a biopolymer obtained from biomass and is biodegradable and more preferably is selected from the group consisting of polybutyrate adipate terephthalate (PBAT), polyhydroxybutyrate (PHB) and polycaprolactone (PCL).

According to another embodiment the polymer component comprises two different sorts of polymers. Preferably the polymers are both biopolymers obtained from biomass and are biodegradable. For example, the polymer component comprises polybutyrate adipate terephthalate (PBAT) and polyhydroxybutyrate (PHB) or polycaprolactone (PCL).

According to another embodiment the polymer component comprises two different sorts of polymers. One sort is a polymer obtained from biomass which is preferably biodegradable and one polymer is obtained from fossil fuels. For example, the polymer component comprises polybutyrate adipate terephthalate (PBAT) or polyhydroxybutyrate (PHB) or polycaprolactone (PCL) in combination with polyethylene or polypropylene.

According to one embodiment of the present invention the ratio of the polymer obtained from biomass to the polymer obtained from fossil fuels present in the polymer composition is from 99:1 to 20:80, preferably from 95:5 to 50:50 and most preferably from 90:10 to 60:40, based on the weight of the polymer components.

According to a preferred embodiment the polymer component consists only of biodegradable polymers, more preferably consist only of one polymer selected from the group consisting of polybutyrate adipate terephthalate (PBAT), polyhydroxyalkanolates (PHA) like polyhydroxybutyrate (PHB), polyhydroxyvalerate (PHV), polyhydroxyhexonate (PHH), polyhydroxyoctanoate (PHO) and copolymers of polyhydroxyalkanoates, polycaprolactone (PCL), polyglycolacids (PGA), polybutylene succinate (PBS), polybutylene succinate adipate (PBSA), polytrimethylene terephthalate (PTT), polybutylene terephthalate (PBT), polybutylene succinate terephthalate (PBST), cellophane (CH), celluloseethers, celluloseesters, starch acetate and starch blends even more preferably consist only of one polymer selected from polybutyrate adipate terephthalate (PBAT), polyhydroxyalkanolates (PHA), polycaprolactone (PCL), starch acetate and starch blends and most preferably consist only of one polymer selected from polybutyrate adipate terephthalate (PBAT), polyhydroxybutyrate (PHB) and polycaprolactone (PCL).

According to another embodiment the at least one polymer of the polymer composition may be an amorphous or a semi-crystalline polymer, i.e. as a polymer comprising crystalline and amorphous fractions or a crystalline polymer. If the polymer is semi-crystalline, it may preferably have a degree of crystallinity of at least 20%, more preferably of at least 40%, and most preferably of at least 50%. According to another embodiment, the polymer may have a degree of crystallinity from 10 to 80%, more preferably from 20 to 70%, and most preferably from 30 to 60%. The degree of crystallinity may be measured with differential scanning calorimetry (DSC).

According to another embodiment, the at least one polymer may have a glass transition temperature, $T_g$, from 0 to 200° C., preferably from 2 to 180° C., and more preferably from 10 to 150° C.

According to another embodiment, the at least one polymer may have a number average molecular weight from 5000 to 500000 g/mol, preferably from 80000 to 3000000 g/mol, and more preferably from 10000 to 100000 g/mol.

According to another embodiment the polymer may be hydrolysis-sensitive and, especially, is hydrolysis-sensitive during compounding. For example, polyesters like polyglycolic acid, polycaprolactone, polyethylene adipate, polybutylene adipate, polyhydroxyalkanoate (PHA), polyhydroxybutyrate, polyalkylene terephthalate, polyethylene terephthalate (PET), polytrimethylene terephthalate, polybutylene terephthalate or polyethylene naphthalate are hydrolysis-sensitive. Other polymers that are hydrolysis-sensitive are, for example, polybutylene terephthalate (PBT) or polycarbonate (PC).

According to another preferred embodiment of the present invention the polymer composition consists only of polymer components and calcium carbonate-comprising filler material. For example, the polymer composition may consist of a biodegradable polymer as polymer component, one further polymer component and the calcium carbonate-comprising filler material. According to a preferred embodiment of the present invention the polymer composition consists only of a biodegradable polymer as polymer component and at least one calcium carbonate-comprising material as filler.

The at Least one Mono-Substituted Succinic Anhydride

According to the present invention at least one mono-substituted succinic anhydride is used.

It is appreciated that the expression "at least one" mono-substituted succinic anhydride means that one or more kinds of mono-substituted succinic anhydride may be provided in the process of the present invention.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride consist only of one mono-substituted succinic anhydride.

According to one embodiment of the present invention the at least one mono-substituted succinic anhydride consists of succinic anhydride mono-substituted with a group selected from any linear, branched, aliphatic and cyclic group having a total amount of carbon atoms from C2 to C30 in the substituent, in case of branched groups having a total amount of carbon atoms from C3 to C30 in the substituent and in case of cyclic groups having a total amount of carbon atoms from C5 to C30 in the substituent.

In one embodiment of the present invention, the at least one mono-substituted succinic anhydride consists of succinic anhydride mono-substituted with a group selected from a linear, branched, aliphatic and cyclic group having a total amount of carbon atoms from C3 to C25 in the substituent and in case of cyclic groups having a total amount of carbon atoms from C5 to C30 in the substituent. For example, the at least one mono-substituted succinic anhydride consists of succinic anhydride mono-substituted with a group selected from a linear, branched, aliphatic and cyclic group having a total amount of carbon atoms from C4 to C20 in the substituent and in case of cyclic groups having a total amount of carbon atoms from C5 to C20 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C25 and most preferably from C4 to C20 in the substituent. Additionally or alternatively, the at least one mono-substituted succinic anhydride consists of succinic anhydride mono-substituted with one group being a branched and aliphatic group having a total amount of carbon atoms from C3 to C30, preferably from C3 to C25 and most preferably from C4 to C20 in the substituent.

Thus, it is preferred that the at least one mono-substituted succinic anhydride consists of succinic anhydride mono-substituted with one group being a linear or branched, alkyl group having a total amount of carbon atoms from C2 to C30 and in case of branched groups C3-C30, preferably from C3 to C25 and most preferably from C4 to C20 in the substituent.

For example, the at least one mono-substituted succinic anhydride consists of succinic anhydride mono-substituted with one group being a linear alkyl group having a total amount of carbon atoms from C2 to C30, preferably from C3 to C25 and most preferably from C4 to C20 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C25 and most preferably from C4 to C20 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear or branched alkenyl group having a total amount of carbon atoms from C2 to C30 and in case of branched groups C3-C30, preferably from C3 to C25 and most preferably from C4 to C20 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, one alkenyl mono-substituted succinic anhydride may be present in an amount of from 20 to 60 wt.-% and preferably of from 30 to 50 wt.-%, based on the total weight of the at least one mono-substituted succinic anhydride.

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), one or more octadecenyl succinic anhydride(s) may be present in an amount of from 20 to 60 wt.-% and preferably of from 30 to 50 wt.-%, based on the total weight of the at least one mono-substituted succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of tri-isobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride may be between 90:10 and 10:90 (wt.-%/wt.-%). For example, the weight ratio between the at least one alkyl mono-substituted succinic anhydride and the at least one alkenyl mono-substituted succinic anhydride may be between 70:30 and 30:70 (wt.-%/wt.-%) or between 60:40 and 40:60.

Alkenyl mono-substituted succinic anhydrides are well known to the skilled person and are commercially available, for example, from Bercen Inc, from Kemira or from Albemarle.

Further known alkenyl mono-substituted succinic anhydrides are branched hexadecenyl succinic anhydrides (CAS No. 32072-96-1), branched octadecenyl succinic anhydrides (CAS No. 28777-98-2) and 2,5-furandione, dihydro-, mono-$C_{15-20}$-alkenyl derivs. (CAS No. 68784-12-3). According to a preferred embodiment of the present invention the at least one mono-substituted succinic anhydride is 2,5-furandione, dihydro-, mono-$C_{15-20}$-alkenyl derivs. (CAS No. 68784-12-3).

The commercially available mono-substituted succinic anhydride solutions may optionally comprise further compounds, for example, mono-substituted succinic acid.

According to one embodiment of the present invention the at least one alkenyl mono-substituted succinic anhydride is used before compounding of the polymer composition in that the at least one mono-substituted succinic anhydride and/or salty reaction products thereof are present on the surface of the at least one calcium carbonate-comprising material.

According to a preferred embodiment of the present invention the at least one mono-substituted succinic anhydride and/or salty reaction products thereof are present on the surface of the at least one calcium carbonate-comprising material in the form of a surface treatment layer.

The term "surface treatment layer" or "surface treated filler material" in the meaning of the present invention refers to a calcium carbonate-comprising filler material which has been contacted with at least one mono-substituted succinic anhydride as surface treatment agent such as to obtain a coating layer comprising the at least one mono-substituted succinic anhydride and/or salty reaction products thereof on at least a part of the surface of the calcium carbonate-comprising filler material. Such surface-treated calcium carbonate-comprising materials and methods for preparing them are described in WO 2014/060286 A1.

Thus, it is appreciated that the treatment layer formed on the surface of the at least one calcium carbonate-comprising filler material comprises the at least one mono-substituted succinic anhydride and/or salty reaction product(s) thereof obtained from contacting the at least one calcium carbonate-comprising filler material with the at least one mono-substituted succinic anhydride. Salty reaction product(s) are, for example, one or more calcium salts of the at least one mono-substituted succinic anhydride.

Thus, it is appreciated that the surface treated filler material, comprises, preferably consists of, at least one calcium carbonate-comprising filler material and a treatment layer comprising at least one mono-substituted succinic anhydride and/or salty reaction product(s) thereof. The treatment layer is formed on the surface of said at least one calcium carbonate-comprising filler material.

In one embodiment of the present invention the treatment layer on the surface of the at least one calcium carbonate-comprising filler material comprises at least one mono-substituted succinic acid, wherein the at least one mono-substituted succinic acid is formed from the applied at least one mono-substituted succinic anhydride. In one embodiment of the present invention, the treatment layer formed on the surface of the at least one calcium carbonate-comprising filler material comprises the at least one mono-substituted succinic anhydride and at least one mono-substituted succinic acid or salty reaction product(s) thereof obtained from contacting the at least one calcium carbonate-comprising filler material with the at least one mono-substituted succinic anhydride and the optional at least one mono-substituted succinic acid. Alternatively, the treatment layer formed on the surface of the at least one calcium carbonate-comprising filler material comprises the at least one mono-substituted succinic anhydride and at least one mono-substituted succinic acid and salty reaction product(s) thereof obtained from contacting the at least one calcium carbonate-comprising filler material with the at least one mono-substituted succinic anhydride and the optional at least one mono-substituted succinic acid.

The treatment layer is preferably characterized in that the total weight of the at least one mono-substituted succinic anhydride and at least one mono-substituted succinic acid and/or salty reaction product(s) thereof on the surface of the surface treated filler material is from 0.1 to 5 mg/m$^2$, more preferably from 0.2 to 4 mg/m$^2$ and most preferably from 1 to 4 mg/m$^2$ of the at least one calcium carbonate-comprising filler material.

The treatment layer is preferably characterized in that the total weight of the at least one mono-substituted succinic anhydride and at least one mono-substituted succinic acid and/or salty reaction product(s) thereof on the surface of the surface treated filler material is from 0.05 to 1 wt.-%/m$^2$, more preferably from 0.1 to 0.5 wt.-%/m$^2$ and most preferably from 0.15 to 0.25 wt.-%/m$^2$ of the at least one calcium carbonate-comprising filler material.

Additionally or alternatively, the treatment layer of the surface treated filler material product comprises the at least one mono-substituted succinic anhydride and the at least one mono-substituted succinic acid and/or salty reaction product(s) thereof in a specific molar ratio. For example, the molar ratio of the at least one mono-substituted succinic anhydride and the at least one mono-substituted succinic acid to the salty reaction product(s) thereof is from 99.9:0.1 to 0.1:99.9, preferably from 70:30 to 90:10.

The wording "molar ratio of the at least one mono-substituted succinic anhydride and the at least one mono-substituted succinic acid to the salty reaction product(s) thereof" in the meaning of the present invention refers to the sum of the molecular weight of the at least one mono-substituted succinic anhydride and the sum of the molecular weight of the at least one mono-substituted succinic acid to the sum of the molecular weight of the mono-substituted succinic anhydride molecules in the salty reaction products thereof and the sum of the molecular weight of the mono-substituted succinic acid molecules in the salty reaction products thereof.

It is further appreciated that the obtained surface treated filler material comprises the treatment layer in an amount of from 0.1 to 4.0 wt.-%, preferably in an amount of from 0.1 to 2.5 wt.-%, more preferably in an amount of from 0.1 to 2 wt.-%, even more preferably in an amount of from 0.1 to 1.5 wt.-%, even more preferably in an amount of from 0.1 to 1 wt.-% and most preferably in an amount of from 0.2 to 0.8 wt.-% based on the total dry weight of the at least one calcium carbonate-comprising filler material.

In view of the very good results obtained, according to one preferred embodiment of the present invention the surface treated filler material comprises
  a) at least one calcium carbonate-comprising filler material having
    i) a weight median particle size $d_{50}$ value in the range from 0.1 µm to 20 µm, and/or
    ii) a top cut $(d_{98}) \leq 50$ µm, and/or
    iii) a specific surface area (BET) of from 0.5 to 150 m$^2$/g as measured using nitrogen and the BET method according to ISO 9277:2010, and/or
    iv) a residual total moisture content of from 0.01 wt.-% to 1 wt.-%, based on the total dry weight of the at least one calcium carbonate-comprising filler material, and
  b) a treatment layer on the surface of the at least one calcium carbonate-comprising filler material comprising at least one mono-substituted succinic anhydride and at least one mono-substituted succinic acid and/or salty reaction product(s) thereof.

According to another preferred embodiment of the present invention the surface treated filler material comprises
  a) at least one calcium carbonate-comprising filler material having
    i) a weight median particle size $d_{50}$ value in the range from 0.1 µm to 20 µm, and/or
    ii) a top cut $(d_{98}) \leq 50$ µm, and/or
    iii) a specific surface area (BET) of from 0.5 to 150 m$^2$/g as measured using nitrogen and the BET method according to ISO 9277:2010, and/or
    iv) a residual total moisture content of from 0.01 wt.-% to 1 wt.-%, based on the total dry weight of the at least one calcium carbonate-comprising filler material, and
  b) a treatment layer on the surface of the at least one calcium carbonate-comprising filler material comprising at least one mono-substituted succinic anhydride and at least one mono-substituted succinic acid and/or salty reaction product(s) thereof wherein the surface treated filler material comprises the treatment layer in an amount of from 0.1 to 3 wt.-%, based on the total dry weight of the at least one calcium carbonate-containing filler material.

According to another embodiment of the present invention the at least one mono-substituted succinic anhydride is used during compounding of the polymer composition in that the at least one mono-substituted succinic anhydride is contacted under mixing with the polymer composition comprising at least one polymer as polymer component and at least one calcium carbonate-comprising material as filler. Therefore, the at least one mono-substituted succinic anhydride is not present on the surface of the calcium carbonate-comprising filler material before mixing and/or compounding. However, during the compounding step at least some of the mono-substituted succinic anhydride may be located on the surface of the calcium carbonate-comprising filler material. Therefore, the polymer composition comprises after compounding mono-substituted succinic anhydride, at least one polymer as polymer component at least one calcium carbonate-comprising material as filler, wherein part of the calcium carbonate-comprising filler material comprises a treatment layer on the surface of the at least one calcium carbonate-comprising filler material comprising at least one mono-substituted succinic anhydride and at least one mono-substituted succinic acid and/or salty reaction product(s) thereof.

According to another embodiment of the present invention the at least one mono-substituted succinic anhydride and/or salty reaction products thereof are present in the polymer composition in an amount of at least 0.1 wt.-%, based on the total dry weight of the at least one calcium carbonate-comprising filler material, preferably in an amount from 0.1 to 4.0 wt.-%, more preferably in an amount from 0.1 to 3.0 wt.-%, even more preferably in an amount from 0.2 to 2.0 wt.-%, even more preferably in an amount from 0.3 to 1.5 wt.-% and most preferably in an amount from 0.4 to 1.2 wt.-%.

According to another embodiment of the present invention the at least one mono-substituted succinic anhydride and/or salty reaction products thereof are present in the polymer composition in an amount of at least 0.005 wt.-%, based on the total weight of the polymer component, preferably in an amount from 0.01 to 5.0 wt.-%, more preferably in an amount from 0.02 to 1.0 wt.-%, even more preferably in an amount from 0.03 to 0.8 wt.-%, even more preferably in an amount from 0.05 to 0.5 wt.-% and most preferably in an amount from 0.07 to 0.3 wt.-%.

The inventors surprisingly found that by the use of at least one mono-substituted succinic anhydride before or during compounding of a polymer composition as described above the stability, especially the thermal stability of a polymer composition comprising at least one polymer as polymer component and calcium carbonate-comprising material as filler can be improved. Therefore, the polymer decomposition during processing is reduced. Additionally or alternatively, the processability of such a polymer composition can be facilitated. Also the mechanical properties, especially the melt flow rate of such polymer compositions can be improved. Additionally or alternatively, the viscosity of such a composition can be increased. Additionally or alternatively, the hydrolysis of the at least one polymer in the polymer composition during compounding with the at least one calcium carbonate-comprising filler material is reduced or prevented.

More precisely, the inventors surprisingly found that by the use of at least one mono-substituted succinic anhydride before or during compounding of a polymer composition as described above the melt flow rate of such a compounded polymer composition can be reduced by at least 10%, in comparison to the same polymer composition that has been treated the same way in the absence of any mono-substituted succinic anhydride.

The term "in comparison to the same polymer composition that has been treated the same way without at least one mono-substituted succinic anhydride" according to the present invention refers to a comparative polymer composition that does not comprise mono-substituted succinic anhydride. Apart from that the polymer composition according to the present invention and the comparative polymer composition are identical which means that they comprise the same compounds. Furthermore, these two polymer compositions have been treated the same way which means that the compounding and storing treatments are identical.

The "melt flow rate" or "MFR", "melt mass flow rate", "melt flow index" or "melt index" according to the present invention is the measure of the ease of flow of melted plastic and is expressed in g/10 min. Typical melt flow instruments are compact and easy to use and known to the skilled person.

According to a preferred embodiment of the present invention the melt flow rate is measured according to DIN EN ISO 1133-1:2011. Preferably, the melt flow rate is measured according to DIN EN ISO 1133-1:2011 by using procedure A.

Preferably, the polymer composition in the shape of granules is made fluid by heating up to 210° C. and forced to flow out of a cylinder through a capillary die having an inner diameter of 2.095 mm and a length of 8 mm. The extruding piston is preferably loaded with dead weights at 2.16 kg. The MFR is obtained under standard conditions.

Alternatively, the polymer composition in the shape of granules is made fluid by heating up to temperatures between 100 and 300° C. and forced to flow out of a cylinder through a capillary die having an inner diameter of 2.095 mm and a length of 8 mm±0.025 mm. The extruding piston is preferably loaded with dead weights between 0.325 kg and 21.6 kg. The MFR is obtained under standard conditions. The heating temperature as well as the weight are depending on the polymer composition and the skilled person knows which combination has to be selected.

For example, if the polymer composition comprises polyethylene (PE) as polymer the heating temperature may be, for example, 190° C. and the dead weight may be, for example, 2.16 kg or 5 kg or 21.6 kg. If the polymer composition comprises polypropylene (PP) as polymer the heating temperature may be, for example, 190° C. and the dead weight may be, for example, 5 kg or the heating temperature may be, for example, 230° C. and the dead weight may be, for example, 2.16 kg or 5 kg.

If the polymer component comprises or consists only of biodegradable polymers, for example, comprises or consist only of polymer selected from the group consisting of polybutyrate adipate terephthalate (PBAT), polyhydroxyalkanolates (PHA) like polyhydroxybutyrate (PHB), polyhydroxyvalerate (PHV), polyhydroxyhexonate (PHH), poly-hydroxyoctanoate (PHO) and copolymers of polyhydroxyalkanoates, polycaprolactone (PCL), polyglycolacids (PGA), polybutylene succinate (PBS), polybutylene succinate adipate (PBSA), polytrimethylene terephthalate (PTT), polybutylene terephthalate (PBT), polybutylene succinate terephthalate (PBST), cellophane (CH), celluloseethers, celluloseesters, starch acetate and starch blends the melt flow rate is preferably measured according to DIN EN ISO 1133-1:2011 by using procedure A and even more preferably the polymer composition in the shape of granules is made fluid by heating up to 210° C. and forced to flow out of a cylinder through a capillary die having an inner diameter of 2.095 mm and a length of 8 mm. The extruding piston is preferably loaded with dead weights at 2.16 kg. The MFR is obtained under standard conditions. According to another preferred embodiment, the polymer composition in the shape of granules is made fluid by heating up to 190° C. and forced to flow out of a cylinder through a capillary die having an inner diameter of 2.095 mm and a length of 8 mm. The extruding piston is preferably loaded with dead weights at 2.16 kg. The MFR is obtained under standard conditions. As set out above the extruding piston is preferably loaded with dead weights at 2.16 kg but also other dead weights, for example, 0.325 kg, 1.2 kg, 3.8 kg, 5 kg, 10 kg or 21.6 kg may be used.

According to another embodiment of the present invention the melt flow rate is measured according to DIN EN ISO 1133-2:2011. This measuring method may be used for materials that are sensitive to time-temperature history and/or moisture.

According to one embodiment of the present invention, the inventors surprisingly found that by the use of at least one mono-substituted succinic anhydride before or during compounding of a polymer composition as described above the melt flow rate of such a compounded polymer composition can be reduced by at least 10%, in comparison to the same polymer composition that has been treated the same way in the absence of any mono-substituted succinic anhydride.

According to one embodiment of the present invention, the inventors surprisingly found that by the use of at least one mono-substituted succinic anhydride before or during compounding of a polymer composition as described above the melt flow rate of such a compounded polymer composition can be reduced by at least 10%, measured according to DIN EN ISO 1133-1:2011 (preferably by procedure A, 2.16 kg, 210° C., granules), in comparison to the same polymer composition that has been treated the same way in the absence of any mono-substituted succinic anhydride.

The inventors also surprisingly found that by the use of at least one mono-substituted succinic anhydride before or during compounding of a polymer composition as described above the viscosity of such a compounded polymer composition can be increased by at least 10%, in comparison to the same polymer composition that has been treated the same way without at least one mono-substituted succinic anhydride.

The "viscosity" or "solution viscosity", "viscosity number", or "reduced viscosity" according to the present invention is the measure of the resistance of the polymer composition/polymer solution to gradual deformation by shear stress or tensile stress. The viscosity of the polymer composition is measured in diluted solution. Alternatively, the viscosity of the polymer composition is measured on the neat polymer which is preferably melted. Typical instruments to measure the viscosity are compact and easy to use and known to the skilled person. For example, the viscosity can be measured by a rotational viscometer, for example, a viscometer that comprises a plate-plate geometry.

According to one embodiment of the present invention the viscosity is measured according to DIN EN ISO 1628-1: 2009+A1:2012. Depending on the used polymer different parts of this norm can be used. For example, if the polymer is a polyvinylchloride part 2 can used, if the polymer is a polyethylene or polypropylene part 3 can used, if the polymer is a polycarbonate part 4 can used, if the polymer is a thermoplastic polyester part 5 can used and if the polymer is a methyl methacrylate polymer part 6 can be used. If the polymer is a mixture comprising at least two different polymers the skilled person has to choose the best working norm for this mixture.

According to a preferred embodiment of the present invention the viscosity is measured according to DIN EN ISO 1628-5:2015.

Preferably, the viscosity is measured according to DIN EN ISO 1628-5:2015. Preferably, the polymer composition is solved in a mixture of phenol and 1,2-dichlorbenzene, in a mixture of phenol and 1,1,2,2-tetrachloroethane, in o-chlorophenol, m-cresol, dichloroacetic acid or a mixture of phenol and 2,4,6-trichlorophenol at a concentration of preferably 0.005 g/ml at 25° C. Procedures A or B may be used and the viscometer to be used may be an Ubbelohde type, size No. 1B, 1C or 2. The viscosity is obtained under standard conditions.

However, also other measurement norms or protocols for determining the viscosity according to the present invention may be used. For example, the viscosity may be measured according to DIN 53728-3:1985-1 or according to ASTM D4603-03(2011)e1.

According to one embodiment of the present invention by the use of at least one mono-substituted succinic anhydride before or during compounding of a polymer composition comprising at least one polymer as polymer component and at least one calcium carbonate-comprising material as filler, the polymer decomposition during processing is reduced and/or the melt flow rate of such a compounded polymer composition is decreased by at least 10% preferably at least 15%, more preferably at least 20% and most preferably at least 25%, in comparison to the same polymer composition that has been treated the same way in the absence of any mono-substituted succinic anhydride and/or the viscosity of such a compounded polymer composition is increased by at least 10% preferably at least 15%, more preferably at least 20% and most preferably at least 25%, in comparison to the same polymer composition that has been treated the same way in the absence of any mono-substituted succinic anhydride.

According to another embodiment of the present invention by the use of at least one mono-substituted succinic anhydride before or during compounding of a polymer composition comprising at least one polymer as polymer component and at least one calcium carbonate-comprising material as filler, the polymer decomposition during processing is reduced and/or the melt flow rate of such a compounded polymer composition is decreased by at least 10% preferably at least 15%, more preferably at least 20% and most preferably at least 25% measured according to DIN EN ISO 1133-1:2011 (preferably by procedure A, 2.16 kg, 210° C., granules), in comparison to the same polymer composition that has been treated the same way in the absence of any mono-substituted succinic anhydride and/or the viscosity of such a compounded polymer composition is increased by at least 10% preferably at least 15%, more preferably at least 20% and most preferably at least 25% measured according to DIN EN ISO 1628-5:2015, in comparison to the same polymer composition that has been treated the same way in the absence of any mono-substituted succinic anhydride.

According to another embodiment of the present invention by the use of at least one mono-substituted succinic anhydride before or during compounding of a polymer composition comprising at least one polymer as polymer component and at least one calcium carbonate-comprising material as filler, the melt flow rate of such a compounded polymer composition is decreased by at least 10% preferably at least 15%, more preferably at least 20% and most preferably at least 25%, preferably measured according to DIN EN ISO 1133-1:2011 (preferably by procedure A, 2.16 kg, 210° C., granules), in comparison to the same polymer composition that has been treated the same way in the absence of any mono-substituted succinic anhydride.

According to another embodiment of the present invention by the use of at least one mono-substituted succinic anhydride before or during compounding of a polymer composition comprising at least one polymer as polymer component and at least one calcium carbonate-comprising material as filler, the viscosity of such a compounded polymer composition is increased by at least 10% preferably at least 15%, more preferably at least 20% and most preferably at least 25%, preferably measured according to DIN EN ISO 1628-5:2015, in comparison to the same polymer composition that has been treated the same way in the absence of any mono-substituted succinic anhydride.

According to another embodiment of the present invention by the use of at least one mono-substituted succinic anhydride before or during compounding of a polymer composition comprising at least one polymer as polymer component and at least one calcium carbonate-comprising material as filler, the viscosity of such a compounded polymer composition is increased by at least 10% preferably at least 15%, more preferably at least 20% and most preferably at least 25%, preferably measured according to DIN EN ISO 1628-1:2012-10 or DIN EN ISO 1628-2:1998-12 or DIN EN ISO 1628-3:2010 or DIN EN ISO 1628-4:1999-03 or DIN EN ISO 1628-6:1990-02, in comparison to the same polymer composition that has been treated the same way in the absence of any mono-substituted succinic anhydride.

According to another embodiment of the present invention by the use of at least one mono-substituted succinic anhydride before or during compounding of a polymer composition comprising at least one polymer as polymer component and at least one calcium carbonate-comprising material as filler, the melt flow rate of such a compounded polymer composition is decreased by at least 10% preferably at least 15%, more preferably at least 20% and most preferably at least 25%, preferably measured according to DIN EN ISO 1133-1:2011 (preferably by procedure A, 2.16 kg, 210° C., granules), in comparison to the same polymer composition that has been treated the same way in the absence of any mono-substituted succinic anhydride, wherein the at least one mono-substituted succinic anhydride and/or salty reaction products thereof are present on the surface of the at least one calcium carbonate-comprising material.

According to another embodiment of the present invention by the use of at least one mono-substituted succinic anhydride before or during compounding of a polymer composition comprising at least one polymer as polymer component and at least one calcium carbonate-comprising material as filler, the viscosity of such a compounded polymer composition is increased by at least 10% preferably at least 15%, more preferably at least 20% and most preferably at least 25%, preferably measured according to DIN EN ISO 1628-5:2015, in comparison to the same polymer composition that has been treated the same way in the absence of any mono-substituted succinic anhydride, wherein the at least one mono-substituted succinic anhydride and/or salty reaction products thereof are present on the surface of the at least one calcium carbonate-comprising material.

According to another embodiment of the present invention by the use of at least one mono-substituted succinic anhydride before or during compounding of a polymer composition comprising at least one polymer as polymer component and at least one calcium carbonate-comprising material as filler, the viscosity of such a compounded polymer composition is increased by at least 10% preferably at least 15%, more preferably at least 20% and most preferably at least 25%, preferably measured according to DIN EN ISO 1628-1:2012-10 or DIN EN ISO 1628-2:1998-12 or DIN EN ISO 1628-3:2010 or DIN EN ISO 1628-4:1999-03 or DIN EN ISO 1628-6:1990-02, in comparison to the same polymer composition that has been treated the same way in the absence of any mono-substituted succinic anhydride, wherein the at least one mono-substituted succinic anhydride and/or salty reaction products thereof are present on the surface of the at least one calcium carbonate-comprising material.

According to another embodiment of the present invention the tensile strain at break of the polymer composition is increased by at least 40%, preferably by at least 100%, more preferably by at least 200% and most preferably by at least 300%, in comparison to the same polymer composition in the absence of any mono-substituted succinic anhydride.

The "tensile strain at break" or the "ultimate tensile strength" according to the present invention is a measure of the force per unit area (MPa or psi) required to break a material in such a manner. Typical instruments for measuring the tensile strain at break are known to the skilled person. The tensile strain at break can be measured according to DIN EN ISO 527:2012 but also other test methods are available. According to a preferred embodiment of the present invention the tensile strain at break is measured according to DIN EN ISO 527-2/1BA/50:2012, which means that the sample is pulled apart in the test with a speed of 50 mm/min. The test specimen of the present invention have the geometry 1BA with the exception that the thickness of the samples is between 1.9±2 mm and the measuring length is 25×5 mm. The tensile strain at break is obtained under standard conditions.

The Polymer Composition

The polymer compositions of the present invention do not comprise polylactic acid.

The term "polylactic acid" according to the present invention refers to polymers that comprise Formula I as repeating unit

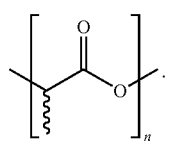

Formula (I)

Lactic acid having the chemical formula $CH_3CH(OH)CO_2H$ is an organic compound which is a white, water-soluble solid or clear liquid that is produced both naturally and synthetically. Lactic acid is chiral and, therefore, refers to two optical isomers. One is known as L-(+)-lactic acid or (S)-lactic acid and the other, its mirror image, is D-(−)-lactic acid or (R)-lactic acid. A mixture of the two in equal amounts is called DL-lactic acid, or racemic lactic acid. Lactic acid is hygroscopic. DL-lactic acid is miscible with water and with ethanol above its melting point which is around 17 to 18° C. D-lactic acid and L-lactic acid have a higher melting point of 53° C. Lactic acid is known to the skilled person.

The polymer compositions of the present invention do not comprise polylactic acid in form of copolymers of polylactic acid and at least one sort of further monomers, for example, polyethylene glycol and also do not comprise polylactic acid in form of homopolymers.

According to one embodiment of the present invention, the calcium carbonate-comprising material is present in the polymer composition in an amount from 0.1 to 85 wt.-%, based on the total weight of the polymer component, preferably in an amount from 3 to 50 wt.-%, more preferably in an amount from 5 to 40 wt.-%, and most preferably in an amount from 10 to 30 wt.-%.

According to another embodiment of the present invention, the polymer composition comprises further additives such as colouring pigments, dyes, waxes, lubricants, oxidative- and/or UV-stabilizers, antioxidants and other fillers, such as talc.

Method for Reducing the Polymer Decomposition During Processing and/or Decreasing the Melt Flow Rate and/or Increasing the Viscosity The present invention further comprises a method for reducing the polymer decomposition during processing and/or decreasing the melt flow rate of a polymer composition according to claim 1 and/or increasing the viscosity of a polymer composition according to claim 1. More precisely, the polymer composition comprises at least one polymer as polymer component and at least one calcium carbonate-comprising material as filler. By the inventive method the melt flow rate may be decreased by at least 10%, in comparison to the same polymer composition that has been treated the same way in the absence of any mono-substituted succinic anhydride and/or the viscosity may be increased by at least 10%, in comparison to the same polymer composition that has been treated the same way in the absence of any mono-substituted succinic anhydride. The method comprises the steps of a) providing at least one polymer as polymer component and b) providing at least one calcium carbonate-comprising material as filler and c) providing at least one mono-substituted succinic anhydride and d) contacting the components of a), b) and c) in any order and e) compounding the contacted components of step d).

According to one embodiment of the present invention a method for reducing the polymer decomposition during processing and/or decreasing the melt flow rate of a polymer composition comprising at least one polymer as polymer component and at least one calcium carbonate-comprising material as filler, by at least 10%, in comparison to the same polymer composition that has been treated the same way in the absence of any mono-substituted succinic anhydride and/or increasing the viscosity of a polymer composition comprising at least one polymer as polymer component and at least one calcium carbonate-comprising material as filler, by at least 10%, in comparison to the same polymer composition that has been treated the same way in the absence of any mono-substituted succinic anhydride is provided the method comprising a) providing at least one polymer as polymer component and
b) providing at least one calcium carbonate-comprising material as filler and
c) providing at least one mono-substituted succinic anhydride
d) contacting the components of a), b) and c) in any order and
e) compounding the contacted components of step d), wherein the polymer composition does not comprise polylactic acid.

According to step a) at least one polymer as polymer component is provided as defined above. The polymer may be provided in solid form or in molten form.

The term "solid" according to the present invention refers to a material that is solid under standard ambient temperature and pressure (SATP) which refers to a temperature of 298.15 K (25° C.) and an absolute pressure of exactly 100000 Pa (1 bar, 14.5 psi, 0.98692 atm). The solid may be in the form of a powder, tablet, granules, flakes etc.

The term "ambient pressure" according to the present invention refers to the standard ambient temperature pressure (SATP) which refers to an absolute pressure of exactly 100000 Pa (1 bar, 14.5 psi, 0.98692 atm).

The term "molten" according to the present invention refers to a material that is molten or viscous under standard ambient temperature and pressure (SATP) which refers to a temperature of 298.15 K (25° C.) and an absolute pressure of exactly 100000 Pa (1 bar, 14.5 psi, 0.98692 atm).

According to the preferred embodiment of the present invention the at least one polymer may be provided in solid form and preferably in the form of granules or pellets.

According to step b) at least one calcium carbonate-comprising filler material is provided as defined above. The calcium carbonate-comprising material may be provided in dry form.

The term "dry" or "dried" material is understood to be a material having between 0.001 to 0.5 wt.-% of water, based on the total weight of the calcium carbonate-comprising material weight.

According to one embodiment of the present invention the calcium carbonate-comprising material is provided in an amount from 0.1 to 85 wt.-%, based on the total weight of the polymer component, preferably in an amount from 3 to 50 wt.-%, more preferably in an amount from 5 to 40 wt.-%, and most preferably in an amount from 10 to 30 wt.-%.

According to step c) at least one mono-substituted succinic anhydride is provided as defined above.

According to one embodiment of the present invention that the at least one mono-substituted succinic anhydride is provided in a total amount of at least 0.1 wt.-%, based on the total dry weight of the at least one calcium carbonate-comprising filler material, preferably in an amount from 0.1 to 4.0 wt.-%, more preferably in an amount from 0.1 to 3.0 wt.-%, even more preferably in an amount from 0.2 to 2.0 wt.-%, even more preferably in an amount from 0.3 to 1.5 wt.-% and most preferably in an amount from 0.4 to 1.2 wt.-%.

According to one embodiment of the present invention the at least one mono-substituted succinic anhydride is provided in an amount of at least 0.005 wt.-%, based on the total weight of the polymer component, preferably in an amount from 0.01 to 5.0 wt.-%, more preferably in an amount from 0.02 to 1.0 wt.-%, even more preferably in an amount from 0.03 to 0.8 wt.-%, even more preferably in an amount from 0.05 to 0.5 wt.-% and most preferably in an amount from 0.07 to 0.3 wt.-%.

The at least one mono-substituted succinic anhydride is provided in solid form or as liquid. According to a preferred embodiment the at least one mono-substituted succinic anhydride is provided as liquid.

The liquid mono-substituted succinic anhydride according to the present invention refers to a material that has a viscosity of less than 5000, preferably of less than 2500, more preferably of less than 1000 mPa·s and most preferably of less than 500 mPa·s at +20° C. (±2° C.), when measured with the appropriate equipment e.g. Physica MCR 300 rheometer (Paar Physica) equipped with the measuring cell TEZ 150 P-C and the CC 28.7 measuring system at a shear rate of 5 s$^{-1}$ and at +20° C. (±2° C.).

If the at least one mono-substituted succinic anhydride is used in form of a surface layer on the surface of the at least one calcium carbonate-comprising material, the at least one mono-substituted succinic anhydride is provided in a quantity such that the total weight of said at least one mono-substituted succinic anhydride and/or the salty reaction products thereof on the surface of the at least one calcium carbonate-comprising filler material is less than 5 mg/m$^2$, preferably less than 4.5 mg/m$^2$ and most preferably less than 4.0 mg/m$^2$, of the at least one calcium carbonate-comprising filler material. For example, the at least one mono-substituted succinic anhydride is preferably provided in a quantity such that the total weight of the at least one mono-substituted succinic anhydride and/or the salty reaction products thereof is from 0.1 to 5 mg/m$^2$, more preferably from 0.2 to 4 mg/m$^2$ and most preferably from 1 to 4 mg/m$^2$ of the at least one calcium carbonate-containing filler material.

According to step d) the components of a), b) and c) are contacted in any order.

The contacting of step d) may be done under mixing conditions.

The skilled man will adapt the mixing conditions (such as the configuration of mixing time and mixing speed) according to his process equipment.

For example, the mixing and homogenization may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to another embodiment of the present invention, process step d) can be carried out in a milling device, for example, in a ball mill, a hammer mill, a rod mill, a vibrating mill, a roll crusher, a centrifugal impact mill, a vertical bead mill, an attrition mill, a pin mill, or a hammer mill.

Process step d) may be carried out at temperatures between 15° C. and 150° C. and preferably at room temperature, i.e. at a temperature of 20° C.±2° C. According to one embodiment of the present invention, process step d) is carried out for at least 1 s, preferably for at least 1 min, e.g. for at least 15 min, 30 min, 1 hour, 2 hours, 4 hours, 6 hours, 8 hours, or 10 hours.

According to one embodiment, step d) comprises the steps of i) mixing the polymer component of step a) and the filler material of step b), and ii) mixing the mono-substituted succinic anhydride of step c) with the mixture of step i).

According to another embodiment, step d) comprises the steps of i) mixing the polymer component of step a) and the mono-substituted succinic anhydride of step c), and ii) mixing the filler material of step b) with the mixture of step i).

According to another embodiment, step d) comprises mixing the polymer component of step a), the mono-substituted succinic anhydride of step c), and the filler material of step b) simultaneously in one step.

According to another embodiment, step d) comprises the steps of i) mixing the polymer component of step a) and a part of the mono-substituted succinic anhydride of step c), ii) mixing the filler material of step b) and the remaining part of the mono-substituted succinic anhydride of step c), and iii) mixing the compositions of steps i) and ii). The mono-substituted succinic anhydride that is mixed with the polymer component and the mono-substituted succinic anhydride that is mixed with the filler material may be the same mono-substituted succinic anhydride or may be different mono-substituted succinic anhydrides. According to a preferred embodiment these mono-substituted succinic anhydrides are the same.

According to a preferred embodiment, step d) comprises the steps of i) mixing the filler material of step b) and the mono-substituted succinic anhydride of step c), and ii) mixing the polymer component of step a) with the mixture of step i). More precisely, in contacting step d) firstly the at least one calcium carbonate-comprising material of step b) is contacted under mixing, in one or more steps, with the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the at least one polymer.

According to another preferred embodiment, step d) comprises the steps of i) mixing the filler material of step b) and a part of the mono-substituted succinic anhydride of step c), and ii) mixing the polymer component of step a) and the remaining part of the mono-substituted succinic anhydride with the mixture of step i). More precisely, in contacting step d) firstly the at least one calcium carbonate-comprising material of step b) is contacted under mixing, in one or more steps, with a part of the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the at least one polymer and the remaining part of the mono-substituted succinic anhydride. The mono-substituted succinic anhydride that is mixed with the polymer component and the mono-substituted succinic anhydride that is mixed with the filler material may be the same mono-substituted succinic anhydride or may be different mono-substituted succinic anhydrides. According to a preferred embodiment these mono-substituted succinic anhydrides are different ones.

If in contacting step d) firstly the at least one calcium carbonate-comprising material of step b) is contacted under mixing, in one or more steps, with the at least one mono-substituted succinic anhydride of step c) or a part thereof such that a treatment layer comprising the at least one mono-substituted succinic anhydride and/or salty reaction product(s) thereof is formed on the surface of said at least one calcium carbonate-comprising material of step b), the contacting may be done as follows.

The contacting of the at least one calcium carbonate-comprising filler material with the at least one mono-substituted succinic anhydride may take place under mixing conditions. The skilled man will adapt these mixing conditions (such as the configuration of mixing pallets and mixing speed) according to his process equipment.

In one preferred embodiment of the present invention, the contacting of the at least one calcium carbonate-comprising filler material with the at least one mono-substituted succinic anhydride may be a continuous process. In this case, it is possible to contact the at least one calcium carbonate-comprising filler material with the at least one mono-substituted succinic anhydride in a constant flow, so that a constant concentration of the at least one mono-substituted succinic anhydride is provided.

Alternatively, the at least one calcium carbonate-comprising filler material is contacted with the at least one mono-substituted succinic anhydride in one step, wherein said at least one mono-substituted succinic anhydride is preferably added in one portion.

In another embodiment of the present invention, the contacting of the at least one calcium carbonate-comprising filler material with the at least one mono-substituted succinic anhydride may be a batch process, i.e. the at least one calcium carbonate-containing filler material is contacted with the at least one mono-substituted succinic anhydride in more than one steps, wherein said at least one mono-substituted succinic anhydride is preferably added in about equal portions. Alternatively, it is also possible to add the at least one mono-substituted succinic anhydride in unequal portions to the at least one calcium carbonate-containing filler material, i.e. in larger and smaller portions.

According to one embodiment of the present invention, contacting of the at least one calcium carbonate-comprising filler material with the at least one mono-substituted succinic anhydride is carried out in a batch or continuous process for a period of time from 0.1 to 5000 s. For example, contacting of the at least one calcium carbonate-comprising filler material with the at least one mono-substituted succinic anhydride is a continuous process and comprises one or several contacting steps and the total contacting time is from 0.1 to 4000 s, preferably from 0.5 to 3000 s and most preferably from 1 to 2000 s.

When implementing the at least one mono-substituted succinic anhydride it may feature a workable viscosity at about room temperature, i.e. the at least one mono-substituted succinic anhydride may be in a liquid state. It is thus one requirement of the present invention that the temperature is adjusted during contacting of the at least one calcium carbonate-comprising filler material with the at least one mono-substituted succinic anhydride such that the at least one mono-substituted succinic anhydride is molten.

Accordingly, it is appreciated that the temperature before and/or during contacting of the at least one calcium carbonate-comprising filler material with the at least one mono-substituted succinic anhydride is adjusted such that the temperature is at least 2° C. above the melting point of the at least one mono-substituted succinic anhydride. For example, the temperature before contacting of the at least one calcium carbonate-comprising filler material with the at least one mono-substituted succinic anhydride is adjusted such that the temperature is at least 2° C. above the melting point of the at least one mono-substituted succinic anhydride.

In one embodiment of the present invention, the temperature before and/or during contacting of the at least one calcium carbonate-comprising filler material with the at least one mono-substituted succinic anhydride is adjusted such that the temperature is at least 5° C., preferably, at least 8° C. and most preferably at least 10° C. above the melting point of the at least one mono-substituted succinic anhydride. For example, the temperature before and/or during contacting of the at least one calcium carbonate-comprising filler material with the at least one mono-substituted succinic anhydride is adjusted such that the temperature is from 2 to 50° C., preferably from 5 to 40° C., more preferably from 8 to 30° C. and most preferably from 10 to 20° C. above the melting point of the at least one mono-substituted succinic anhydride. In one embodiment of the present invention, the contacting of the at least one calcium carbonate-comprising filler material with the at least one mono-substituted succinic anhydride is thus carried out at a treatment temperature of below 200° C. For example, the contacting of at least one calcium carbonate-comprising filler material with the at least one mono-substituted succinic anhydride is carried out at a treatment temperature of from 30 to 200° C., preferably of from 80 to 150° C. and most preferably of from 110 to 130° C.

The treatment time for carrying out the contacting of the at least one calcium carbonate-comprising filler material with the at least one mono-substituted succinic anhydride is carried out for a period of 5000 s or less, preferably for a period of 4000 s or less, more preferably for a period of 3000 s or less and most preferably from 0.1 to 2000 s. For example, contacting of the at least one calcium carbonate-comprising filler material with the at least one mono-substituted succinic anhydride is carried out for a period of 1200 s. In general, the length of contacting the at least one calcium carbonate-comprising filler material with the at least one mono-substituted succinic anhydride is determined by the treatment temperature applied during said contacting. For example, where a treatment temperature of about 200° C. is applied, the treatment time is as short as, for example, about 0.1. If a treatment temperature of about 120° C. is applied, the treatment time can be as long as, for example, about 1200 s.

In one embodiment of the present invention, the at least one calcium carbonate-comprising filler material is preheated, i.e. activated, before contacting of the at least one calcium carbonate-comprising filler material with the at least one mono-substituted succinic anhydride is carried out. That is to say, the at least one calcium carbonate-comprising filler material is treated at a temperature of from 50 to 200° C., preferably of from 80 to 200° C., more preferably of from 90 to 150° C. and most preferably of from 100 to 130° C. before contacting of the at least one calcium carbonate-comprising filler material with the at least one mono-substituted succinic anhydride is carried out. The treatment time for carrying out the preheating of the at least one calcium carbonate-comprising filler material is carried out for a period of 30 min or less, preferably for a period of 20 min or less and more preferably for a period of 15 min or less. In one embodiment of the present invention, the preheating of the at least one calcium carbonate-comprising filler material is carried out at a temperature that is of about equal to the temperature implemented during contacting of the at least one calcium carbonate-comprising filler material with the at least one mono-substituted succinic anhydride.

The term "equal" temperature in the meaning of the present invention refers to a preheating temperature that is at most 20° C., preferably at most 15° C., more preferably 10° C. and most preferably at most 5° C. below or above the temperature implemented during contacting of the at least one calcium carbonate-comprising filler material with the at least one mono-substituted succinic anhydride.

According to step e) the contacted components of step d) are compounded. The term "compounding" according to the present invention refers to the preparation of a polymer or plastic formulation. During compounding the contacted components of step d) are mixed and/or blended in a molten or softened state in order to achieve a homogenous blend of the different raw materials. Compounding methods are known to the skilled person.

According to one embodiment of the present invention the compounding and homogenization may take place by means of a dough kneader. Dough kneaders are able to mix and knead compositions and particularly those with a high viscosity. Dough kneaders function by rotating one or more Sigma- or Z-type blades horizontally inside a bowl or dish. Equipment that may be used is available, for example, from Kenwood Ltd.

According to another embodiment of the present invention the compounding and homogenization may take place by means of an extruder, for example a single or a twin screw extruder. Extruders are able to mix and compound compositions. Extruders function by rotating one or more screws inside a housing. Equipment that may be used may comprise a base unit and an extruder. For example, the base unit may be a Haake Polylab OS from Thermo Scientific and the extruder may be a Rheomex CTW 100 OS from Thermo Scientific.

According to another embodiment of the present invention the compounding and homogenization may take place by means of a laboratory compounder. Laboratory compounders are able to mix and knead compositions. Equipment that may be used may comprise a base unit, a compounder, and a kneader. For example, the base unit may be a Haake Polylab OS, the compounder may be a Haake Rheomix 600 OS and the kneader may be a Roller Roters 600, all from Thermo Scientific. RheoDrive7 may be used as software for evaluating the test results.

According to another embodiment of the present invention the compounding and homogenization may take place by means of a twin roll mill. Twin roll mills are able to mix and knead compositions. An exemplary roll mill is the Walzwerk 150×400 from Dr. Collin GmbH, Germany.

Process step e) may be carried out at temperatures between 15° C. and 350° C. According to one embodiment of the present invention process step e) may be carried out at room temperature, i.e. at a temperature of 20° C.±2° C. According to a preferred embodiment, process step e) is carried out at temperatures above room temperature, preferably at temperatures between 50° C. and 320° C., more preferably between 80° C. and 300° C., even more preferably between 100° C. and 280° C. and most preferably between 150° C. and 260° C. According to one embodiment of the present invention, process step e) is carried out for at least 1 s, preferably for at least 1 min, e.g. for at least 15 min, 30 min, 1 hour, 2 hours, 4 hours, 6 hours, 8 hours, or 10 hours.

According to another embodiment, in the step e) heat and pressure may be applied. The heat and the pressure may be applied successively. In a preferred embodiment the heat and stress are applied simultaneously. In another preferred embodiment different steps of heat and/or pressure are applied successively.

For example, the heat and pressure conditions may take place by means of a hot press procedure. For hot pressing any pressure devices may be used that can additionally be heated during the pressing process. The heating can be performed, for example, by inductive heating or by indirect resistance heating. During the hot pressing the mould plates may be cooled by water cooling to control the temperature of the moulds. Equipment that may be used is available, for example, from Dr. Collin GmbH, Germany.

The hot pressing may be carried out at temperatures between 15° C. and 300° C., preferably at temperatures between 50° C. and 280° C., more preferably at temperatures between 70° C. and 250° C. and most preferably at temperatures of 220° C. The hot pressing may be carried out at pressures between 2 bar and 400 bar, preferably at pressures between 10 bar and 350 bar, more preferably at pressures between 15 bar and 300 bar and most preferably at pressures between 15 bar and 250 bar.

According to one embodiment of the present invention, the hot pressing is carried out for at least 1 s, preferably for at least 50 s or for at least 100 s, 120 s, 160 s, 180 s, 200 s or 240 s.

The inventors surprisingly found that by the method according to the present invention the stability, especially the thermal stability of a polymer composition comprising at least one polymer as polymer component and calcium carbonate-comprising material as filler can be improved. Therefore, the polymer decomposition during processing of such a polymer composition is reduced. Additionally or alternatively, the processability of such a polymer composition can be facilitated. Additionally or alternatively, the mechanical properties, for example, the melt flow rate of such polymer composition can be improved by the method according to the present invention. Additionally or alternatively, the viscosity of such polymer composition can be improved by the method according to the present invention.

More precisely, by the method according to the present invention the polymer decomposition during processing is reduced and/or the melt flow rate of a polymer composition comprising at least one polymer as polymer component and at least one calcium carbonate-comprising filler material is reduced by at least 10%, preferably at least 15%, more preferably at least 20% and most preferably at least 25%, in comparison to the same polymer composition that has been treated the same way in the absence of any mono-substituted succinic anhydride and/or the viscosity of a polymer composition comprising at least one polymer as polymer component and at least one calcium carbonate-comprising filler material is increased by at least 10%, preferably at least 15%, more preferably at least 20% and most preferably at least 25%, in comparison to the same polymer composition that has been treated the same way in the absence of any mono-substituted succinic anhydride, wherein the polymer composition does not comprise polylactic acid.

According to one embodiment, by the method according to the present invention the polymer decomposition during processing is reduced and/or the melt flow rate of a polymer composition comprising at least one polymer as polymer component and at least one calcium carbonate-comprising filler material is reduced by at least 10%, preferably at least 15%, more preferably at least 20% and most preferably at least 25% measured according to DIN EN ISO 1133-1:2011 (preferably by procedure A, 2.16 kg, 210° C., granules), in comparison to the same polymer composition that has been treated the same way in the absence of any mono-substituted succinic anhydride and/or the viscosity of a polymer composition comprising at least one polymer as polymer component and at least one calcium carbonate-comprising filler material is increased by at least 10%, preferably at least 15%, more preferably at least 20% and most preferably at least 25% measured according to DIN EN ISO 1628-5:2015, in comparison to the same polymer composition that has been treated the same way in the absence of any mono-substituted succinic anhydride, wherein the polymer composition does not comprise polylactic acid.

According to another embodiment of the present invention by the method according to the present invention the tensile strain at break of a polymer composition comprising at least one polymer as polymer component and at least one calcium carbonate-comprising filler material is increased by at least 40%, preferably by at least 100%, more preferably by at least 200% and most preferably by at least 300%, in comparison to the same polymer composition without at least one mono-substituted succinic anhydride, wherein the polymer composition does not comprise polylactic acid.

Article According to the Present Invention

Another aspect of the present invention is directed to an article comprising a polymer composition obtainable by a process comprising the steps of
a) providing at least one polymer as polymer component and
b) providing at least one calcium carbonate-comprising material as filler and
c) providing at least one mono-substituted succinic anhydride
d) contacting the components of a), b) and c) in any order and
e) compounding the contacted components of step d),
wherein the article is selected from the group comprising hygiene products, medical and healthcare products, filter products, geotextile products, agriculture and horticulture products, clothing, footwear and baggage products, household and industrial products, packaging products, construction products and the like, wherein the polymer composition does not comprise polylactic acid.

According to steps a) to c) at least one polymer as polymer component, at least one calcium carbonate-comprising material as filler and at least one mono-substituted succinic anhydride is provided as defined above.

According to steps d) and e) the components of a), b) and c) are contacted in any order and the contacted components of step d) are compounded as defined above.

The article is selected from the group comprising hygiene products, medical and healthcare products, filter products, geotextile products, agriculture and horticulture products, clothing, footwear and baggage products, household and industrial products, packaging products, construction products and the like.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with nonwoven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water barriers, sand infiltration barrier for drainage tile and landfill liners.

Preferably, the agriculture and horticulture products are selected from the group comprising crop covers, plant protection, seed blankets, weed control fabrics, greenhouse shading, root control bags, bio-degradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, wipes like household care wipes, floor care wipes, cleaning wipes, pet care wipes etc., automotive building, cable wrapping, civil engineering, filtration packaging, protective clothing, primary and secondary carpet backing, composites, marine sail laminates, tablecover laminates, chopped strand mats, backing/stabilizer for machine embroidery, packaging where porosity is needed, insulation like fiberglass batting, pillows, cushions, padding like upholstery padding, batting in quilts or comforters, consumer and medical face masks, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

Use of the Compound Polymer Composition

Another aspect of the present invention is directed to the use of a polymer composition obtainable by a process comprising the steps of a) providing at least one polymer as polymer component and b) providing at least one calcium carbonate-comprising material as filler and c) providing at least one mono-substituted succinic anhydride d) contacting the components of a), b) and c) in any order and e) compounding the contacted components of step d), in hygiene products, medical and healthcare products, filter products, geotextile products, agriculture and horticulture products, clothing, footwear and baggage products, household and industrial products, packaging products, construction products and the like, wherein the polymer composition does not comprise polylactic acid.

According to steps a) to c) at least one polymer as polymer component, at least one calcium carbonate-comprising material as filler and at least one mono-substituted succinic anhydride is provided as defined above.

According to steps d) and e) the components of a), b) and c) are contacted in any order and the contacted components of step d) are compounded as defined above.

The polymer composition is used in hygiene products, medical and healthcare products, filter products, geotextile products, agriculture and horticulture products, clothing, footwear and baggage products, household and industrial products, packaging products, construction products and the like.

The invention claimed is:

1. A method of preparing a polymer composition, the method comprising using at least one mono-substituted succinic anhydride before or during compounding of the polymer composition, wherein the polymer composition comprises at least one polymer as a polymer component and at least one calcium carbonate-comprising material as a filler, to decrease the melt flow rate of such a compounded polymer composition by at least 10% and/or to increase the viscosity of such a compounded polymer composition by at least 10%, in comparison to the same polymer composition that has been treated the same way in the absence of any mono-substituted succinic anhydride, wherein the at least one polymer is a biodegradable polymer obtained from a biopolymer selected from the group consisting of polybutyrate adipate terephthalate (PBAT), polyhydroxybutyrate (PHB), polyhydroxyvalerate (PHV), polyhydroxyhexonate (PHH), polyhydroxyoctanoate (PHO) and copolymers of polyhydroxyalkanoates, polycaprolactone (PCL), polyglycolacids (PGA), polybutylene succinate (PBS), polybutylene succinate adipate (PBSA), polytrimethylene terephthalate (PTT), polybutylene terephthalate (PBT), polybutylene succinate terephthalate (PBST), cellophane (CH), celluloseethers, celluloseesters, starch acetate and starch blends, and wherein the polymer composition does not comprise polylactic acid.

2. The method according to claim 1, wherein the at least one mono-substituted succinic anhydride is used before compounding of the polymer composition in that the at least one mono-substituted succinic anhydride or a salty reaction product thereof is present on the surface of the at least one calcium carbonate-comprising material.

3. The method according to claim 1, wherein the at least one mono-substituted succinic anhydride is used during compounding of the polymer composition in that the at least one mono-substituted succinic anhydride is contacted under mixing with the polymer composition comprising at least one polymer as the polymer component and at least one calcium carbonate-comprising material as the filler.

4. The method according to claim 1, wherein the polymer composition further comprises additives selected from the group consisting of colouring pigments, dyes, waxes, lubricants, oxidative- and/or UV-stabilizers, antioxidants, talc and other fillers.

5. The method according to claim 1, wherein the at least one polymer is selected from the group consisting of polybutyrate adipate terephthalate (PBAT), polyhydroxybutyrate (PHB) and polycaprolactone (PCL).

6. The method according to claim 1, wherein the polymer composition comprises two polymers, wherein each of the two polymers is independently selected from the group consisting of polybutyrate adipate terephthalate (PBAT), polyhydroxybutyrate (PHB) and polycaprolactone (PCL).

7. The method according to claim 1 for use to reduce the polymer decomposition during processing.

8. The method according to claim 1, wherein the at least one mono-substituted succinic anhydride comprises succinic anhydride mono-substituted with a group selected from the group consisting of a linear, branched, aliphatic and cyclic group having a total amount of carbon atoms selected from the group consisting of from C2 to C30, from C3 to C25 and from C4 to C20 in the substituent.

9. The method according to claim 8, wherein:
(a) when the group is a branched group, the total amount of carbon atoms in the substituent is selected from the group consisting of C3 to C30, C3 to C25 and C4 to C20; or
(b) when the group is a cyclic group, the total number of carbons in the substituent is selected from the group consisting of C5 to C30, C5 to C25 and C5 to C20.

10. The method according to claim 1, wherein the at least one mono-substituted succinic anhydride is at least one alkyl mono-substituted succinic anhydride.

11. The method according to claim 10, wherein the at least one mono-substituted succinic anhydride is selected from the group consisting of: at least one alkyl mono-substituted succinic anhydride selected from the group consisting of ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof; and at least one alkenyl mono-substituted succinic anhydride.

12. The method according to claim 1, wherein the at least one mono-substituted succinic anhydride or a salty reaction product thereof is present in the polymer composition in an amount of at least 0.1 wt.-%, based on the total dry weight of the at least one calcium carbonate-comprising filler material.

13. The method according to claim 12, wherein the amount of the at least one mono-substituted succinic anhydride or a salty reaction product thereof is in a range selected from the group consisting of from 0.1 wt.-% to 4.0 wt.-%, 0.1 wt.-% to 3.0 wt.-%, 0.2 wt.-% to 2.0 wt.-%, 0.3 wt.-% to 1.5 wt.-%, and 0.4 wt.-% to 1.2 wt.-%.

14. The method according to claim 1, wherein the at least one mono-substituted succinic anhydride or a salty reaction product thereof is present in the polymer composition in an amount of at least 0.005 wt.-%, based on the total weight of the polymer component.

15. The method according to claim 14, wherein the amount of the at least one mono-substituted succinic anhydride or a salty reaction product thereof is in a range selected from the group consisting of from 0.01 wt.-% to 5.0 wt.-%, 0.02 wt.-% to 1.0 wt.-%, 0.03 wt.-% to 0.8 wt.-%, 0.05 wt.-% to 0.5 wt.-%, and 0.07 wt.-% to 0.3 wt.-%.

16. The method according to claim 1, wherein the calcium carbonate-comprising material is ground calcium carbonate.

17. The method according to claim 16, wherein the ground calcium carbonate is selected from the group consisting of marble, limestone, dolomite and/or chalk, precipitated calcium carbonate, vaterite, calcite and/or aragonite, and mixtures thereof.

18. The method according to claim 1, wherein the calcium carbonate-comprising material has:
i) a weight median particle size $d_{50}$ value in the range from 0.1 µm to 20 µm; and/or
ii) a top cut ($d_{98}$) of ≤50 µm; and/or
iii) a specific surface area (BET) of from 0.5 m$^2$/g to 150 m$^2$/g as measured using nitrogen and the BET method according to ISO 9277:2010; and/or
v) a residual total moisture content of from 0.01 wt.-% to 1 wt.-%, based on the total dry weight of the at least one calcium carbonate-comprising material.

19. The method according to claim 18, wherein:
i) the weight median particle size $d_{50}$ is in a range selected from the group consisting of 0.25 µm to 15 µm, and 0.7 µm to 7 µm; and/or
ii) the top cut ($d_{98}$) is selected from the group consisting of ≤30 µm, ≤20 µm and ≤15 µm; and/or
iii) the specific surface area (BET) is in a range selected from the group consisting of from 1 m$^2$/g to 60 m$^2$/g and 1.5 m$^2$/g to 15 m$^2$/g; and/or
iv) the residual total moisture content is in a range selected from the group consisting of 0.02 wt.-% to 0.5 wt.-%, 0.03 wt.-% to 0.3 wt.-% and 0.04 wt.-% to 0.15 wt.-%.

20. The method according to claim 1, wherein the at least one calcium carbonate-comprising material is present in the polymer composition in an amount from 0.1 wt.-% to 85 wt.-%, based on the total weight of the polymer component.

21. The method according to claim 20, wherein the amount of the calcium carbonate-comprising material is in a range selected from the group consisting of from 3 wt.-% to 50 wt.-%, from 5 wt.-% to 40 wt.-%, and from 10 wt.-% to 30 wt.-%.

22. The method according to claim 1, wherein the polymer composition comprises two polymers, wherein one of the two polymers is obtained from the biopolymer and the other of the two polymers is obtained from a fossil fuel.

23. The method according to claim 22, wherein the polymer obtained from the fossil fuel is selected from the group consisting of polyethylene (PE), polypropylene (PP), polymethylpentene (PMP), polybutene-1 (PB-1), polyketone (PK), polystyrene (PS), polyvinylchloride (PVC) and mixtures thereof.

24. A method of reducing polymer decomposition of a polymer composition comprising at least one polymer as a polymer component and at least one calcium carbonate-comprising material as a filler during processing and decreasing the melt flow rate of the polymer composition by at least 10% and/or increasing the viscosity of the polymer composition by at least 10%, in comparison to the same polymer composition that has been treated the same way in the absence of any mono-substituted succinic anhydride, the method comprising:
- a) providing at least one polymer as the polymer component;
- b) providing at least one calcium carbonate-comprising material as the filler;
- c) providing at least one mono-substituted succinic anhydride;
- d) contacting the components of a), b) and c) in any order; and
- e) compounding the contacted components of step d),
- wherein the at least one polymer is a biodegradable polymer obtained from a biopolymer, and
- wherein the polymer composition does not comprise polylactic acid.

25. The method according to claim 24, wherein in contacting step d) firstly the at least one calcium carbonate-comprising material of step b) is contacted under mixing, in one or more steps, with the at least one mono-substituted succinic anhydride of step c) such that a treatment layer comprising the at least one mono-substituted succinic anhydride and/or salty reaction product(s) thereof is formed on the surface of said at least one calcium carbonate-comprising material of step b), and secondly this surface-treated calcium carbonate-comprising material is contacted under mixing, in one or more steps, with the at least one polymer.

26. The method according to claim 24 for use to reduce the polymer decomposition during processing.

27. A polymer composition obtained by a process comprising the steps of:
- a) providing at least one polymer as a polymer component;
- b) providing at least one calcium carbonate-comprising material as a filler;
- c) providing at least one mono-substituted succinic anhydride;
- d) contacting the components of a), b) and c) in any order; and
- e) compounding the contacted components of step d),
- wherein the polymer composition is incorporated into a hygiene product, a medical product, a healthcare product, a filter product, a geotextile product, an agriculture product, a horticulture product, clothing, a footwear product, a baggage product, a household product, an industrial product, a packaging product, a construction product and the like, wherein the at least one polymer is a biodegradable polymer obtained from a biopolymer,
- wherein the polymer composition does not comprise polylactic acid, and
- wherein the composition decreases the melt flow rate of the polymer composition by at least 10% and/or increases the viscosity of the polymer composition by at least 10%, when compared to the same polymer composition that has been treated the same way but in the absence of any mono-substituted succinic anhydride.

28. An article comprising a polymer composition obtained by a process comprising the steps of:
- a) providing at least one polymer as a polymer component;
- b) providing at least one calcium carbonate-comprising material as a filler;
- c) providing at least one mono-substituted succinic anhydride;
- d) contacting the components of a), b) and c) in any order; and
- e) compounding the contacted components of step d),
- wherein the article is selected from the group comprising a hygiene product, a medical product, a healthcare product, a filter product, a geotextile product, an agriculture product, a horticulture product, clothing, a footwear product, a baggage product, a household product, an industrial product, a packaging product, a construction product and the like, wherein the at least one polymer is a biodegradable polymer obtained from a biopolymer,
- wherein the polymer composition does not comprise polylactic acid, and
- wherein the composition decreases the melt flow rate of the polymer composition by at least 10% and/or increases the viscosity of the polymer composition by at least 10%, when compared to the same polymer composition that has been treated the same way but in the absence of any mono-substituted succinic anhydride.

* * * * *